(12) United States Patent
Janardhan et al.

(10) Patent No.: US 11,930,856 B2
(45) Date of Patent: Mar. 19, 2024

(54) DEVICES, SYSTEMS AND METHODS FOR PERFORMING AGE VERIFICATION

(71) Applicant: Altria Client Services LLC, Richmond, VA (US)

(72) Inventors: Srinivasan Janardhan, Glen Allen, VA (US); Gerd Kobal, Sandy Hook, VA (US); Yezdi B. Pithawalla, Midlothian, VA (US); Timo Engelke, Richmond, VA (US); Ulrich Bockholt, Richmond, VA (US)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 0 days.

(21) Appl. No.: 17/704,249

(22) Filed: Mar. 25, 2022

(65) Prior Publication Data

US 2022/0211115 A1    Jul. 7, 2022

Related U.S. Application Data

(63) Continuation of application No. 15/928,711, filed on Mar. 22, 2018, now Pat. No. 11,284,646.

(51) Int. Cl.
*A24F 40/53* (2020.01)
*A24F 40/65* (2020.01)
(Continued)

(52) U.S. Cl.
CPC .............. *A24F 40/53* (2020.01); *A24F 40/65* (2020.01); *G06T 13/205* (2013.01); *G06T 13/60* (2013.01);
(Continued)

(58) Field of Classification Search
CPC .............. G06F 2111/18; G06F 3/0481; G06F 3/04817; G06F 9/4443; G06F 3/04847;
(Continued)

(56) References Cited

U.S. PATENT DOCUMENTS

| | | |
|---|---|---|
| 1,694,603 A | 12/1928 | Piagneri |
| 5,042,510 A | 8/1991 | Curtiss et al. |

(Continued)

FOREIGN PATENT DOCUMENTS

| | | |
|---|---|---|
| JP | 2000-353248 A | 12/2000 |
| JP | 2003-103045 A | 4/2003 |

(Continued)

OTHER PUBLICATIONS

Official Action for corresponding Japanese Application No. 2008-514232.

(Continued)

*Primary Examiner* — Todd Buttram
(74) *Attorney, Agent, or Firm* — Harness, Dickey & Pierce, P.L.C.

(57) ABSTRACT

A method, system, device, and/or non-transitory computer readable medium for performing age verification, the device including a memory having stored thereon computer readable instructions, and processing circuitry configured to execute the computer readable instructions to cause the device to, receive identity verification information from an adult vaper, determine a personal profile corresponding to the adult vaper based on the identity verification information, and enable operation of an electronic vaping device based on the received identity verification information and the personal profile.

20 Claims, 14 Drawing Sheets

(51) Int. Cl.
  *G06T 13/20* (2011.01)
  *G06T 13/60* (2011.01)
  *G06T 19/00* (2011.01)
  *G10L 25/18* (2013.01)
  *G10L 25/51* (2013.01)
  *A24F 40/10* (2020.01)

(52) U.S. Cl.
  CPC ............ *G06T 19/006* (2013.01); *G10L 25/18* (2013.01); *G10L 25/51* (2013.01); *A24F 40/10* (2020.01)

(58) Field of Classification Search
  CPC .............. G06F 11/3664; G06F 3/0304; G06F 3/011–015; G06K 9/00664–00704; G06T 19/00; G06T 17/00; G06T 7/00; G06T 19/006; G06T 2215/16; H04N 5/272; H04N 2201/3245; A63F 13/10
  See application file for complete search history.

(56) References Cited

U.S. PATENT DOCUMENTS

| | | | |
|---|---|---|---|
| 5,322,075 | A | 6/1994 | Deevi et al. |
| 5,414,544 | A | 5/1995 | Aoyagi et al. |
| 5,591,368 | A | 1/1997 | Fleischhauer et al. |
| 5,610,674 | A | 3/1997 | Martin |
| 5,692,525 | A | 12/1997 | Counts et al. |
| 5,934,289 | A | 8/1999 | Watkins et al. |
| 6,026,820 | A | 2/2000 | Baggett, Jr. et al. |
| 6,053,176 | A | 4/2000 | Adams et al. |
| 6,169,595 | B1 | 1/2001 | Manne |
| 6,175,343 | B1 | 1/2001 | Mitchell et al. |
| 6,243,491 | B1 | 6/2001 | Andersson |
| 6,325,475 | B1 | 12/2001 | Hayes et al. |
| 6,500,008 | B1 | 12/2002 | Ebersole et al. |
| 6,606,998 | B1 | 8/2003 | Gold |
| 6,616,454 | B2 | 9/2003 | Ebersole, Jr. et al. |
| 6,686,915 | B2 | 2/2004 | Andrews |
| 6,690,338 | B1 | 2/2004 | Maguire, Jr. |
| 6,752,498 | B2 | 6/2004 | Covannon et al. |
| 6,760,026 | B2 | 7/2004 | Li et al. |
| 6,790,496 | B1 | 9/2004 | Levander et al. |
| 6,822,648 | B2 | 11/2004 | Furlong et al. |
| 6,847,336 | B1 | 1/2005 | Lemelson et al. |
| 6,854,470 | B1 | 2/2005 | Pu |
| 7,538,782 | B2 | 5/2009 | Kuroki et al. |
| 8,223,015 | B2 | 7/2012 | Yuuki |
| 8,625,200 | B2 | 1/2014 | Smith et al. |
| 9,022,039 | B2 | 5/2015 | Hearn |
| 9,648,907 | B2 | 5/2017 | Kobal et al. |
| 11,284,646 | B2 * | 3/2022 | Janardhan ............... G10L 25/18 |
| 2002/0179101 | A1 | 12/2002 | Chavez |
| 2003/0227470 | A1 | 12/2003 | Genc et al. |
| 2004/0003820 | A1 | 1/2004 | Iannuzzi |
| 2004/0104935 | A1 | 6/2004 | Williamson et al. |
| 2004/0131232 | A1 | 7/2004 | Meisner et al. |
| 2005/0179617 | A1 | 8/2005 | Matsui et al. |
| 2007/0006889 | A1 | 1/2007 | Kobal et al. |
| 2012/0136270 | A1 | 5/2012 | Leuthardt et al. |
| 2013/0319439 | A1 * | 12/2013 | Gorelick ............ A24F 40/65 131/329 |
| 2013/0340775 | A1 * | 12/2013 | Juster ............... H04L 12/1827 131/273 |
| 2014/0002442 | A1 | 1/2014 | Lamb et al. |
| 2014/0123990 | A1 * | 5/2014 | Timmermans .......... A24F 40/60 131/328 |
| 2015/0181945 | A1 * | 7/2015 | Tremblay ............... A24F 40/60 131/328 |
| 2016/0261425 | A1 * | 9/2016 | Horton ............... H04L 67/1097 |
| 2016/0363567 | A1 * | 12/2016 | Blackley ............... A24F 40/51 |
| 2016/0374401 | A1 * | 12/2016 | Liu ................ A24F 40/50 131/328 |
| 2017/0196260 | A1 * | 7/2017 | Kobal ............. A24F 42/60 |
| 2018/0240353 | A1 * | 8/2018 | Bhuttar ............... G06T 19/006 |
| 2018/0263283 | A1 * | 9/2018 | Popplewell ............ G05B 13/024 |
| 2018/0303413 | A1 * | 10/2018 | Hassan ............. A61B 5/4842 |
| 2019/0000147 | A1 * | 1/2019 | Koc .................. A24F 40/65 |
| 2019/0213324 | A1 * | 7/2019 | Thorn ................ H04N 23/66 |
| 2019/0295304 | A1 * | 9/2019 | Janardhan ............ G06T 13/205 |
| 2020/0360652 | A1 * | 11/2020 | Kanana ................. A61B 5/7455 |
| 2022/0211115 | A1 * | 7/2022 | Janardhan ............ G06T 19/006 |

FOREIGN PATENT DOCUMENTS

| | | |
|---|---|---|
| JP | 2003-244726 A | 8/2003 |
| JP | 2003-250509 A | 9/2003 |
| JP | 2005-108108 A | 4/2005 |
| JP | 5115272 B2 | 1/2013 |

OTHER PUBLICATIONS

Bordnick, P.S et al., "Utilizing virtual reality to standardize nicotine craving research: A pilot study", Addictive Behaviors, Pergamon Press, Oxford, GB, vol. 29, No. 9, Dec. 2004, pp. 1889-1894.

Pollini, L. et al., "A Synthetic Environment for Dynamic Systems Control and Distributed Simulation", IEEE Signal Processing Magazine, IEEE Service Center, Piscataway, NJ, vol. 20, No. 2, Apr. 2000, pp. 49-61.

Chu et al., "Alliance Technology, and Outcome in the Treatment of Anxious Youth", Cognitive and Behavioral Practice, Association for Advancement of Behavior Therapy, NY, vol. 11, No. 1, Jan. 2004, ppp. 44-55.

International Search Report and Written Opinion dated Apr. 27, 2007 for International Application No. PCT/IB2006/002870.

Decision of Rejection for corresponding Japanese Application No. 2008-514232 dated Mar. 24, 2014.

* cited by examiner

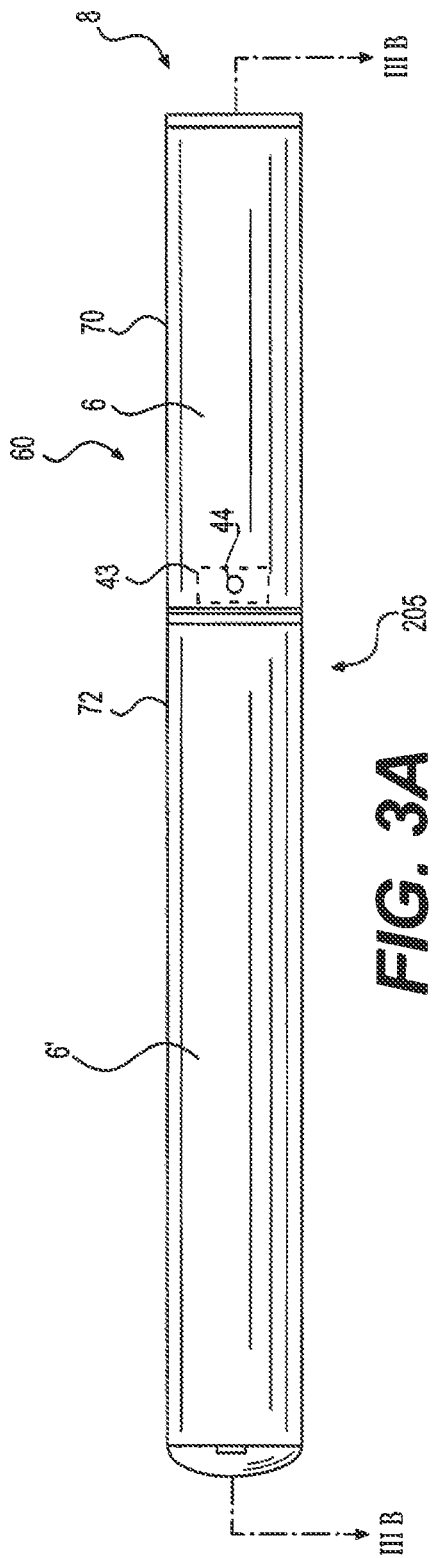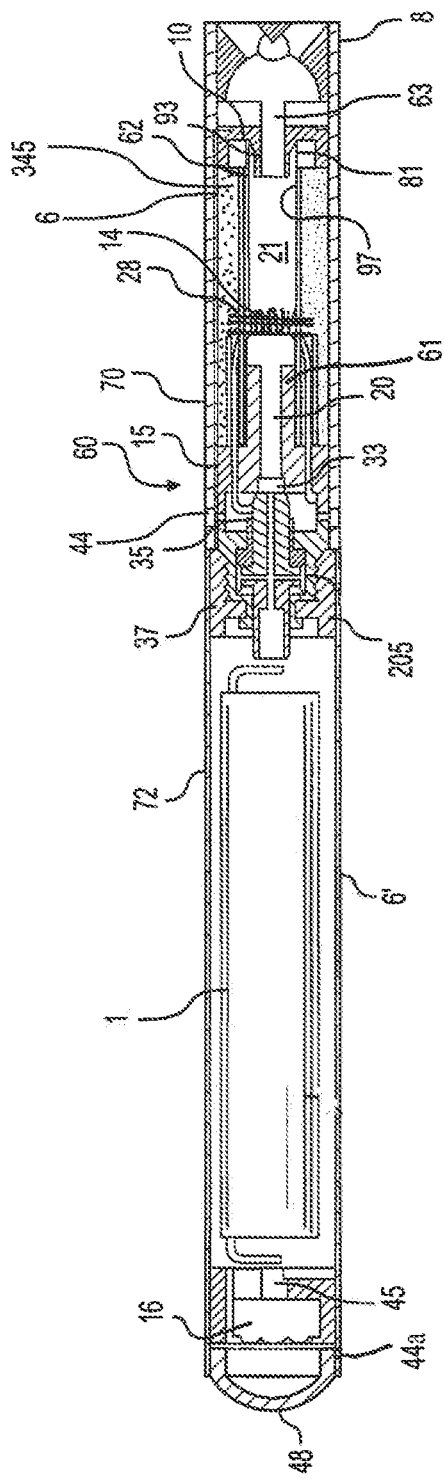
FIG. 3A
FIG. 3B

EXAMPLE OF RECORDED VAPING SESSION AUDIO SPECTRUM GENERATED USING FFT OF THE INCOMING AUDIO SIGNAL, THE AUDIO SPECTRUM INCLUDING BACKGROUND NOISE

EXAMPLE AUDIO SPECTRUM OF PREVIOUSLY RECORDED UNBIASED AMBIENT NOISE

BIASED AUDIO SPECTRUM GENERATED BY SUBTRACTING NOISE FROM THE AUDIO SPECTRUM (E.G., NOISE CANCELLATION)

NORMALIZED AUDIO SPECTRUM (ON HISTOGRAM) OF THE RECORDED VAPING SESSION

DETERMINED CHARACTERISTIC AUDIO FREQUENCIES ASSOCIATED WITH THE DESIRED VAPING STYLE AND/ OR DESIRED MOUTH OPENING STATE

DEVICES, SYSTEMS AND METHODS FOR PERFORMING AGE VERIFICATION

CROSS-REFERENCE TO RELATED APPLICATION

This is a continuation of U.S. application Ser. No. 15/928,711, filed Mar. 22, 2018, the disclosure of which is incorporated herein by reference in its entirety.

BACKGROUND

Field

The present disclosure relates to methods, systems, apparatuses and/or non-transitory computer readable media for providing an electronic vaping device (e-vaping device) vapor simulations and/or simulation applications, and more specifically to methods, systems, apparatuses and/or non-transitory computer readable media for providing improved augmented reality (AR) and/or virtual reality (VR) vapor simulation applications for use in conjunction with an electronic vaping device.

Description

Various techniques currently exist for producing augmented reality (AR) or virtual reality (VR) experiences using AR and/or VR devices, such as AR glasses or headsets, VR glasses or headsets, VR headsets where a smartphone may be loaded into the VR headset and provide the processing and/or display for the VR headset, etc. Additionally, electronic vaping devices (e-vaping devices) are available that generate a vapor using a pre-vapor formulation, a pre-dispersion formulation, etc.

Accordingly, various example embodiments are directed to a vapor simulation system that provides for the visualization of vapor formations generated by an e-vaping device when an adult vaper wears an AR and/or VR device.

SUMMARY

At least one example embodiment relates to a device for generating a vaping simulation. In at least one example embodiment, the device includes a memory having stored thereon computer readable instructions, and at least one processor configured to execute the computer readable instructions to receive audio signals related to vaping of an e-vaping device from a microphone, determine vaping characteristics of the vaping based on the audio signals, generate a vaping simulation based on the determined vaping characteristics, and transmit the generated vaping simulation to a headset to be displayed on a display panel included in the headset.

In at least one example embodiment, the at least one processor is configured to execute the computer readable instructions to receive sensor information related to the vaping of the e-vaping device from sensors of the e-vaping device, and the determining the vaping characteristics of the vaping is further based on the sensor information.

In at least one example embodiment, the at least one processor is configured to execute the computer readable instructions to determine spatial position information of the headset, the spatial position information including field of view information associated with the headset, and the generating the vaping simulation is further based on the determined spatial position information.

In at least one example embodiment, the display panel is a screen installed in the headset.

In at least one example embodiment, the display panel is a screen of a smart device.

In at least one example embodiment, the display panel includes at least one lens.

In at least one example embodiment, the headset includes a smart device, and the at least one processor and a memory are included in the smart device.

In at least one example embodiment, the received sensor information includes sensor information corresponding to a drawing of vapor from the e-vaping device, and the received audio signals includes audio signals corresponding to ejection of the drawn vapor recorded by the microphone.

In at least one example embodiment, the determined vaping characteristics include at least one of vaping duration, vapor ejection velocity, vapor direction, vapor density, or vapor particle life.

In at least one example embodiment, the at least one processor is configured to execute the computer readable instructions to determine the vaping characteristics by generating an audio spectrum of the vaping, normalizing the audio spectrum using a recorded audio spectrum without vaping audio signals, correlating the normalized audio spectrum to at least one template audio spectrum of a plurality of audio spectrums, and determining the vaping characteristics of the audio signals based on the correlated normalized audio spectrum.

In at least one example embodiment, the at least one processor is further configured to execute the computer readable instructions to determine vapor volume information and strength of ejection information based on the determined vaping characteristics.

In at least one example embodiment, the at least one processor is further configured to execute the computer readable instructions to generate the vaping simulation by calculating a vapor model for the vaping simulation based on the determined vapor volume information, the determined strength of ejection information, and the determined vaping characteristics, calculating virtual coordinate information of the calculated vapor model based on the determined vaping characteristics and the determined spatial position information of the headset, the determined spatial position information including spatial position information corresponding to a time when ejection of drawn vapor occurred and spatial position information corresponding to a time subsequent to the ejection of the drawn vapor, and generating the vaping simulation using a particle engine based on the calculated vapor model and the calculated virtual coordinate information.

In at least one example embodiment, the at least one processor is further configured to execute the computer readable instructions to transmit the generated vaping simulation to the headset by displaying the generated vaping simulation in an augmented reality (AR) mode, the AR mode including superimposing the generated vaping simulation over the headset's environment.

In at least one example embodiment, the at least one processor is further configured to execute the computer readable instructions to transmit the generated vaping simulation to the headset by displaying the generated vaping simulation in a virtual reality (VR) mode, the VR mode including displaying the generated vaping simulation in a generated virtual environment.

Some example embodiments provide that the device includes at least one of a Bluetooth sensor, a light sensor, a flow sensor, or a pressure sensor, that the at least one processor is further configured to receive data from the at least one of the Bluetooth sensor, the light sensor, the flow sensor, or the pressure sensor, the received data indicating a duration of time that the e-vaping device is engaged, and the determined vaping characteristics includes the received data.

Some example embodiments provide that the device includes a camera configured to obtain an image of an adult vaper, and that the at least one processor is further configured to receive the image of the adult vaper from the camera, determine an identity of the adult vaper based on the received image, and load personalized vaping parameters based on the determined identity.

Some example embodiments provide that the device includes an olfactory stimulation device configured to produce an aroma or fragrance.

Some example embodiments provide that the olfactory stimulation device is configured to produce the aroma or the fragrance based on personalized vaping parameters.

At least one example embodiment relates to a system for generating a vaping simulation. In at least one example embodiment, the system includes a headset including at least one display panel, a memory having stored thereon computer readable instructions, and at least one processor configured to execute the computer readable instructions to receive audio signals related to vaping of an e-vaping device from a microphone, determine vaping characteristics of the vaping based on the audio signals and the sensor information, generate a vaping simulation based on the determined vaping characteristics, and transmit the generated vaping simulation to a headset to be displayed on a display panel included in the headset.

In at least one example embodiment, the at least one processor is further configured to execute the computer readable instructions to receive sensor information related to the vaping of the e-vaping device from sensors of the e-vaping device, and the determining the vaping characteristics of the vaping is further based on the sensor information.

In at least one example embodiment, the at least one processor is further configured to execute the computer readable instructions to determine spatial position information of the headset, the spatial position information including field of view information associated with the headset, and the generating the vaping simulation is further based on the determined spatial position information.

In at least one example embodiment, the display panel is a screen installed in the headset.

In at least one example embodiment, the display panel is a screen of a smart device.

In at least one example embodiment, the display panel includes at least one lens.

In at least some example embodiments, the headset includes the memory and the at least one processor.

In at least some example embodiments, the headset includes a smart device, and the at least one processor and a memory are included in the smart device.

Some example embodiments provide that the system includes at least one computer including the memory and the at least one processor, the at least one computer connected to the headset over a network.

In at least some example embodiments, the received sensor information includes sensor information corresponding to a drawing of vapor from the e-vaping device, and the received audio signals include audio signals corresponding to an ejection of the drawn vapor.

In at least some example embodiments, the at least one processor is further configured to execute the computer readable instructions to determine the vaping characteristics by generating an audio spectrum of the vaping, normalizing the audio spectrum using a recorded audio spectrum without vaping audio signals, correlating the normalized audio spectrum to at least one template audio spectrum of a plurality of audio spectrums, and determining the vaping characteristics of the audio signals based on the correlated normalized audio spectrum.

In at least some example embodiments, the at least one processor is further configured to determine vapor volume information and strength of ejection information based on the determined vaping characteristics.

In at least some example embodiments, the at least one processor is further configured to execute the computer readable instructions to generate the vaping simulation by calculating a vapor model for the vaping simulation based on the determined vapor volume information, the determined strength of ejection information, and the determined vaping characteristics, calculating virtual coordinate information of the calculated vapor model based on the determined vaping characteristics and the determined spatial position information of the headset, the determined spatial information including spatial position information corresponding to a time when ejection of drawn vapor occurred and spatial position information corresponding to a time subsequent to the ejection of the drawn vapor, and generating the vaping simulation using a particle engine based on the calculated vapor model and the calculated virtual coordinate information.

In at least some example embodiments, the at least one processor is further configured to execute the computer readable instructions to transmit the generated vaping simulation to the headset by displaying the generated vaping simulation in an augmented reality (AR) mode, the AR mode including superimposing the generated vaping simulation over the headset's environment.

In at least some example embodiments, the at least one processor is further configured to execute the computer readable instructions to transmit the generated vaping simulation to the headset by displaying the generated vaping simulation in a virtual reality (VR) mode, the VR mode including displaying the generated vaping simulation in a generated virtual environment.

Some example embodiments provide that the system includes at least one of a Bluetooth sensor, a light sensor, a flow sensor, or a pressure sensor, the at least one processor is further configured to receive data from the at least one of the Bluetooth sensor, the light sensor, the flow sensor, or the pressure sensor, the received data indicating a duration of time that the e-vaping device is engaged, and the determined vaping characteristics includes the received data.

Some example embodiments provide that the system includes a camera configured to obtain an image of an adult vaper, and the at least one processor is further configured to receive the image of the adult vaper from the camera, determine an identity of the adult vaper based on the received image, and load personalized vaping parameters based on the determined identity.

Some example embodiments provide that the system includes an olfactory stimulation device configured to produce an aroma or fragrance.

In some example embodiments, the olfactory stimulation device is configured to produce the aroma or the fragrance based on personalized vaping parameters.

At least one example embodiment relates to a method for generating a vaping simulation. In at least one example embodiment, the method includes receiving, using at least one processor, audio signals related to vaping of an e-vaping device from a microphone, determining, using the at least one processor, vapor characteristics of the vaping based on the audio signals and the sensor information, generating, using the at least one processor, a vaping simulation based on the determined vaping characteristics, and transmitting the generated vaping simulation to a headset to be displayed on a display panel included in the headset.

In at least one example embodiment, the method further includes receiving, using the at least one processor, sensor information related to the vaping of the e-vaping device from sensors of the e-vaping device, and the determining the vaping characteristics of the vaping is further based on the sensor information.

In at least one example embodiment, the method includes determining, using the at least one processor, spatial position information of the headset, the spatial position information including field of view information associated with the headset, and the generating the vaping simulation is further based on the determined spatial position information.

In at least one example embodiment, the headset includes a smart device, and the at least one processor and a memory are included in the smart device.

In at least one example embodiment, the determining the vaping characteristics includes generating an audio spectrum of the vaping, normalizing the audio spectrum using a recorded audio spectrum without vaping audio signals, correlating the normalized audio spectrum to at least one template audio spectrum of a plurality of audio spectrums, and determining the vaping characteristics of the audio signals based on the correlated normalized audio spectrum.

Some example embodiments provide that the method includes determining, using the at least one processor, vapor volume information and strength of ejection information based on the determined vaping characteristics.

In at least one example embodiment, the generating the vaping simulation includes calculating a vapor model for the vaping simulation based on the determined vapor volume information, the determined strength of ejection information, and the determined vaping characteristics, calculating virtual coordinate information of the calculated vapor model based on the determined vaping characteristics and the determined spatial position information of the headset, the determined spatial position information including spatial position information corresponding to a time when ejection of drawn vapor occurred and spatial position information corresponding to a time subsequent to the ejection of the drawn vapor, and generating the vaping simulation using a particle engine based on the calculated vapor model and the calculated virtual coordinate information.

In at least one example embodiment, the transmitting the generated vaping simulation to the headset includes displaying the generated vaping simulation in an augmented reality (AR) mode, the AR mode including superimposing the generated vaping simulation over the headset's environment.

In at least one example embodiment, the transmitting the generated vaping simulation to the headset includes displaying the generated vaping simulation in a virtual reality (VR) mode, the VR mode including displaying the generated vaping simulation in a generated virtual environment.

Some example embodiments provide that the method includes receiving, using the at least one processor, data from at least one of a Bluetooth sensor, a light sensor, a flow sensor, and a pressure sensor, the received data indicating a duration of time that the e-vaping device is engaged, and the determined vaping characteristics includes the received data.

Some example embodiments provide that the method includes receiving, using the at least one processor, the image of the adult vaper from a camera, determining, using the at least one processor, an identity of the adult vaper based on the received image, and loading, using the at least one processor, personalized vaping parameters based on the determined identity.

Some example embodiments provide that the method includes producing, using the at least one processor, an aroma or fragrance through an olfactory stimulation device based on the personalized vaping parameters.

At least one example embodiment relates to a non-transitory computer readable medium including computer readable instructions. In at least one example embodiment, when at least one processor executes the computer readable instructions, the at least one processor is caused to receive audio signals related to vaping of an e-vaping device from a microphone, determine vaping characteristics of the vaping based on the audio signals, generate a vaping simulation based on the determined vaping characteristics, and transmit the generated vaping simulation to a headset to be displayed on a display panel included in the headset.

In at least one example embodiment, the at least one processor is further caused to receive sensor information related to the vaping of the e-vaping device from sensors of the e-vaping device, and the determining the vaping characteristics of the vaping is further based on the sensor information.

In at least on example embodiment, the at least one processor is further caused to determine spatial position information of the headset, the spatial position information including field of view information associated with the headset, and the generating the vaping simulation is further based on the determined spatial position information.

In at least one example embodiment, the headset includes a smart device, and the at least one processor and a memory are included in the smart device.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 3A is a side view of an e-vaping device according to at least one example embodiment.

FIG. 3B is a cross-sectional view along line IIIB-IIIB of the e-vaping device of FIG. 3A, according to at least one example embodiment.

Figure 1:
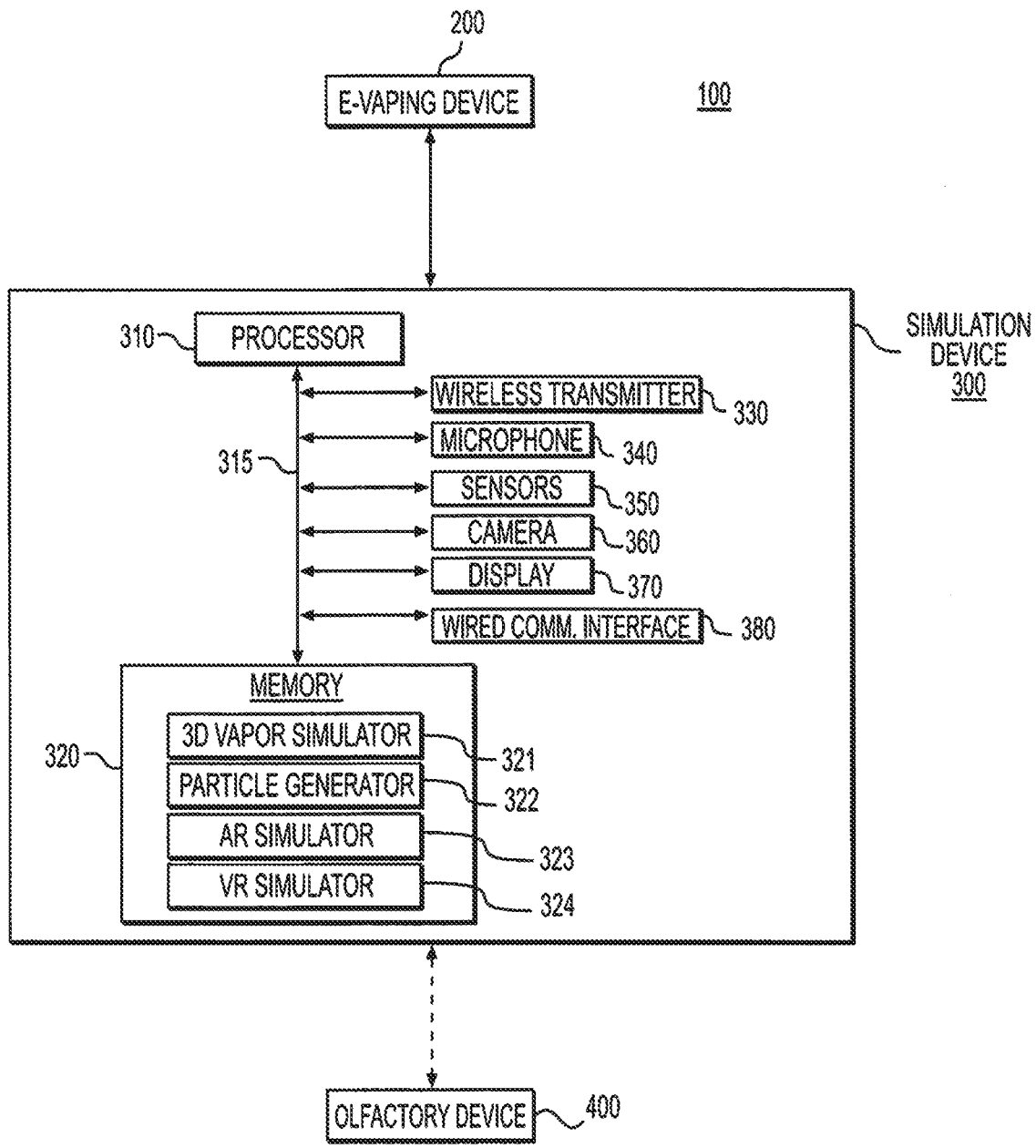
FIG. 1 illustrates a system for generating a vapor simulation using a simulation device according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, regions, layers, and/or sections, these elements, regions, layers, and/or sections, should not be limited by these terms. These terms are only used to distinguish one element, region, layer, or section, from another region, layer, or section. Thus, a first element, region, layer, or section, discussed below may be termed a second element, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, and/or elements, but do not preclude the presence or addition of one or more other features, integers, steps, operations, elements, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element, there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, or a combination of hardware and software. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software modules, data files, data structures, and/or the like, capable of being implemented by one or more hardware devices, such as one or more of the hardware devices mentioned above.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, element, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by a combined functional unit, or may be performed by different functional units than the units discussed herein. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store data, such as input and/or output data, computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or elements such as the described system, architecture, devices, circuit, and the like, may be connected or combined to be different from the above-described methods, or results may be appropriately achieved by other elements or equivalents.

FIG. 1 illustrates a system for generating a vapor simulation using a simulation device according to at least one example embodiment. The vapor simulation system 100 includes one or more encoded e-vaping devices 200, one or more simulation devices 300 (e.g., a wearable or other type of simulation device), and/or one or more olfactory devices 400. According to some example embodiments, the system may also include one or more servers (not shown), such as a cloud server, or platform server that may be connected to the e-vaping device 200, simulation device 300, and/or olfactory device 400 via a wired and/or wireless communication network, such as the Internet, an intranet, a wide area network, a local area network, a personal area network, etc. While a single e-vaping device 200, a single simulation device 300, and a single olfactory device 400 are illustrated in FIG. 1, the example embodiments are not limited thereto and there may be a greater or lesser number of each individual element in the system and/or other additional elements included in the system according to other example embodiments. For example, according to some example embodiments, the olfactory device 400 may be omitted from the vapor simulation system.

According to various example embodiments, the e-vaping device 200 may be an electronic vaping device that is configured to heat a substance (e.g., a pre-vapor formulation, dry herbs, essential oils, etc.) and/or vaporize the substance in order to produce a vapor that is drawn by an adult vaper The substance may be a material or combination of materials that may be transformed into a vapor, such as a liquid, solid and/or gel formulation including, but not limited to, water, beads, solvents, active ingredients, ethanol, plant extracts, natural or artificial flavors, and/or vapor formers such as glycerin and propylene glycol. The housing of the e-vaping device 200 may take any form, such as a tube-like housing, a pipe-shaped housing, a cartridge-shaped housing, etc. In addition, the e-vaping device may include various sensors, such as a wireless transmitter (e.g., a Bluetooth transmitter), a microphone, a puff sensor, a flow sensor, a pressure sensor, etc., and/or input/output (I/O) indicators, such as a heater activation light, etc., that may provide information regarding the time at which the adult vaper has started and stopped the drawing of vapor from the e-vaping device 200, the start and stop of the heater activation and/or the heating of the substance, the amount of vapor produced by the e-vaping device, the amount of vapor drawn from the e-vaping device, etc. For example, according to at least one example embodiment, the e-vaping device 200 may include a Bluetooth transmitter (e.g., Bluetooth and/or Bluetooth Low Energy (LE), etc.), or other wired and/or wireless transmitter (e.g., USB, NFC, ZigBee, WiFi, etc.), that communicates with a computing device, such as the simulation device 300, or a dedicated vapor simulator device, etc., the time that the adult vaper has engaged the heater of the e-vaping device (e.g., through the engagement of a ON/OFF button or by starting a puff, etc.), the time that the adult vaper has disengaged the heater of the e-vaping device (e.g., through the disengagement of the ON/OFF button, or by ending a puff, etc.), the generated vapor flow volume (e.g., determined based on readings from the puff sensor, pressure sensor, and/or flow sensor), the generated vapor flow rate, etc. According to some example embodiments, one or more of the sensors may be integrated into the e-vaping device and/or one or more of the sensors may be connected to the e-vaping device via a wired and/or wireless connection (e.g., USB, Bluetooth, NFC, ZigBee, WiFi, etc.).

Additionally, the e-vaping device 200 may act as a beacon, e.g., via a Bluetooth transmitter and/or other wireless transmitter, that may transmit various information to one or more simulation device 300, a dedicated vapor simulator device, other e-vaping devices, etc., in order to provide social media interactivity and/or messaging. For example, the e-vaping device 200 may transmit, periodically and/or at a desired time, information related to the e-vaping device, such as the manufacturer and/or brand of the e-vaping device, information related to the pre-vapor formulation currently stored in the e-vaping device (e.g., brand name of the pre-vapor formulation, flavor information, fill amount/ amount remaining, etc.), puff count, status of the adult vaper, information related to the adult vaper (e.g., the adult vaper's age-verification status, adult vaper identity, adult vaper loyalty program ID, adult vaper social media account username, adult vaper, adult vaper vaping preferences, adult vaper advertising preferences, adult vaper social media preferences, etc.), etc. The beacon information that is transmitted by the e-vaping device 200 may be received by a receiving device, such as the simulation device 300, other simulation devices (e.g., simulation devices operated by other adult vapers), special purpose information receivers that may be installed in various locations, such as stores, restaurants, an adult vaper's home, an adult vaper's vehicle, etc. The beacon information may then be used by the receiving device to enable various functionality, such as permitting social interaction between various adult vapers (e.g., generating an "avatar" of the adult vaper to be displayed in another adult vaper's vapor simulation device based on the information associated with the adult vaper and/or the adult vaper's e-vaping device, such as generating a physical representation of the adult vaper from photos and/or images stored in a cloud network associated with the adult vaper's account name and/or adult vaper loyalty program ID, etc.), enabling the adult vapers within beacon transmitter range to exchange messages via the simulation devices, enabling the receiving devices to download the adult vaper's preferences and provide specialized and/or programmed functionality based on the downloaded preferences (e.g., changing the room settings, such as lighting levels, music and/or TV sound levels, etc.). Moreover, the beacon information may be used to provide targeted advertising and/or offers to the adult vaper from the proprietor of the receiving device. For example, if the receiving device is associated with an e-vaping supply store, the receiving device may perform age verification of the adult vaper based on the received beacon information, and if the adult vaper is age verified, may determine whether the adult vaper's privacy preferences allow for the transmission of targeted advertising and/or offers, and then may transmit targeted advertising and/or promotions to the adult vaper via the vapor simulation device, the adult vaper's phone, email, etc. The targeted advertising and/or promotions may include coupons and/or offers related to the e-vaping device that the adult vaper operates, the pre-vapor formulation that the adult vaper vapes, the fill level of the e-vaping device, directions to the e-vaping supply store, allow for the online purchase of various e-vaping device related supplies, etc.

According to various example embodiments, the e-vaping device 200 may be connected to a simulation device 300 via a wireless and/or wired communication connection (e.g., Internet connection, Wi-Fi connection, Bluetooth connection, USB connection, etc.). According to at least one example embodiment, the simulation device 300 may have a headset form factor, eyeglass form factor, and/or any other visual aid form factor that may be worn by an adult vaper and will provide visual stimuli to the adult vaper's eyes. In other example embodiments, the simulation device 300 may be an immersive visual system, such as a large or ultra large screen display system, a projector system, and/or other visually immersive display system. According to some example embodiments, the simulation device 300 may be an augmented reality (AR) device, a virtual reality (VR) device, a combination AR/VR device, and/or any other device capable of providing an AR experience or VR experience in connection with an e-vaping device. According to some example embodiments, the simulation device 300 may include at least one processor 310, a communication bus 315, and a memory 320. The memory 320 may include a three-dimensional (3D) vapor simulator routine 321, a particle generator routine 322, an AR simulator 323, and/or a VR simulator 324, etc. However, the example embodiments are not limited thereto, and according to some example embodiments, one or more of the 3D vapor simulator routine 321, the particle generator routine 322, the AR simulator 323, and the VR simulator 324 may be combined into one or more routines, for example, the 3D vapor simulator routine 321 may include the particle generator routine 322, the AR simulator 323, and/or the VR simulator 324, etc. The 3D vapor simulator routine 321, the particle generator routine 322, the AR simulator 323, and the VR simulator 324 will be discussed in more detail in connection with FIGS. 4, 5A, and 5B.

In at least one example embodiment, the processor 310 may be at least one processor (and/or processor cores, distributed processors, networked processors, etc.), which may be configured to control one or more elements of the simulation device 300. The processor 310 is configured to execute processes by retrieving program code (e.g., computer readable instructions) and data from the memory 320 to process them, thereby executing control and functions of the entire simulation device 300. Once the program instructions are loaded into the processor 310, the processor 310 executes the program instructions, thereby transforming the processor 310 into a special purpose processor.

In at least one example embodiment, the memory 320 may be a non-transitory computer-readable storage medium and may include a random access memory (RAM), a read only memory (ROM), and/or a permanent mass storage device such as a disk drive, a solid state drive, etc. Stored in the memory 320 are computer readable instructions (e.g., program code) for the 3D vapor simulator routine 321, the particle generator routine 322, the AR simulator 323, and/or the VR simulator 324, etc. Additionally, the memory 320 may store additional data (not shown) for use with the stored program code, such as adult vaper profile data, sensor information, program setting data, e-vaping device data, etc. Such software elements may be loaded from a non-transitory computer-readable storage medium independent of the memory 320, using a drive mechanism (not shown) connected to the simulation device 300 through a wired communication interface 380 via a wired communication protocol, such as Ethernet, USB, FireWire, eSATA, ExpressCard, Thunderbolt, etc. In other example embodiments, software elements may be loaded onto the memory 320 through the wireless transmitter 330 via a wireless communication protocol, such as Wi-Fi, Bluetooth, Near-Field Communications (NFC), Infra-Red (IR) communications, RFID communications, 3G, 4G LTE, etc.

In at least one example embodiment, the communication bus 315 may enable communication and data transmission to be performed between elements of the simulation device 300. The bus 315 may be implemented using a high-speed serial bus, a parallel bus, and/or any other appropriate communication technology.

The simulation device 300 may also include a wireless transmitter 330 and/or a wired communication interface 380. The wireless transmitter 330 and/or the wired communication interface 380 may enable the processor 310 to communicate with and/or transfer data to/from the e-vaping device 200 and/or other computing devices (not shown), such as a server, a personal computer (PC), a laptop, a smartphone, a tablet, a gaming device, etc. Examples of data transferred between the processor 310 and the e-vaping device 200 may include profile data related to one or more adult vapers, software updates to the 3D vapor simulator routine 321, the particle generator routine 322, the AR simulator 323, and/or the VR simulator 324, configuration data, etc.

In at least one example embodiment, the wireless transmitter 330 and/or the wired communication interface 380 may be computer hardware elements for connecting the e-vaping device to one or more computer networks (e.g., the Internet, an Intranet, a Wide Area Network (WAN), a Local Area Network (LAN), a Personal Area Network (PAN), a Cellular Communication Network, a Data Network, etc.) and/or one or more external computing devices (e.g., a PC, a server, a database, a laptop computer, a smartphone, a tablet, other smart devices, an Internet-of-Things (IOT) device, a gaming console, a Personal Digital Assistant (PDA), etc.).

The simulation device 300 may also include various input/output (I/O) devices, such as a microphone 340, sensors 350 (e.g., gyroscopes, accelerometers, GPS sensors, other position and location sensors, altitude sensors, pressure sensors, etc.), a camera 360, etc. The I/O devices may be integrated into the simulation device 300, external to the simulation device 300 and connected to the simulation device 300 via a wired and/or wireless connection, etc. Additionally, the simulation device 300 may also include a display 370 (and/or projector, etc.) to provide an AR or VR vapor simulation experience to the adult vaper based on information collected from the e-vaping device 200 and associated sensors. The display 370 may be one or more display screens (and/or display lenses, etc.) that provide one or more image to be viewed by the adult vaper. For example, the one or more images may be stereoscopic, lenticular, etc., images corresponding to the adult vaper's left and right eyes that are displayed on the display 370 through two separate lenses corresponding to the adult vaper's left and right eyes, or a single display 370 that is partitioned such that the image corresponding to the left eye and the image corresponding to the right eye merge and appear to be a single coherent image. According to some example embodiments, the display 370 may be provided by another device, such as a smartphone, a tablet, etc., that is connected to and/or integrated into, the simulation device 300. For example, the AR or VR vapor simulation may simulate a vapor ejection cloud on the display 370 of the simulation device 300, even if no vapor ejection cloud was physically formed. Further, the vapor simulation may provide the vapor ejection cloud as an overlay to the adult vaper's actual environment, such as the room that the adult vaper is located in, etc., when the simulation device 300 is operated as an AR headset and/or AR glasses, or may be provided in a generated 3D VR environment when the simulation device 300 is operated as a VR headset. The vapor simulation may be accompanied by aromas produced by an olfactory device 400 in some example embodiments.

Further, according to some example embodiments, an olfactory device 400 may be connected via the wired communication interface 380 and/or the wireless transmitter 330, or may be integrated into the simulation device 300. The olfactory device 400 may include a spray jet, a heater, a capsule system, and/or other aroma producing method, such that the olfactory device 400 may produce an aroma based on instructions from the processor 310. The olfactory device 400 may use perfumes, liquids, gels, herbs, chemical mixtures that represent aromas of natural products such as tobacco, etc., that may be released, projected, heated, etc., to produce one or more desired aromas based on adult vaper preference settings, and/or may be connected to the AR or VR experience being projected to the adult vaper. For example, if the adult vaper is presented with a virtual beach environment, the olfactory device 400 may produce aromas that are reminiscent of a beach environment, such as saltwater aromas, sand aromas, etc. As another example, the adult vaper may set preference data in his or her adult vaper profile that indicates that the adult vaper enjoys the aroma of specific tobacco products, such as a particular cigarette or cigar brand, and the olfactory device 400 may produce an aroma evocative of the desired cigarette or cigar brand.

Moreover, the simulation device 300 may also include harnesses, straps, bracing, support, etc., that allows the adult vaper to attach the simulation device 300 to the adult vaper's head, face, eyes, etc. According to some example embodiments, the simulation device 300 may include a battery to power the simulation device 300 (and/or charge the e-vaping device) so that the adult vaper may move freely in his or her environment. In other example embodiments, the simulation device 300 may be powered using a wired connection to an electrical outlet. Moreover, one or more components of the simulation device 300, such as the processor 310, the bus 315, the memory 320 (including, e.g., the vapor simulator routine 321, particle generator routine 322, AR simulator 323, and/or VR simulator 324, etc.), the wireless transmitter 330, the microphone 340, the sensors 350, the camera 360, the display 370, the wired communication interface 380, etc., may be provided by at least one separate device, such as a smartphone or other portable sized computing device, expansion card, etc., and may be connected to and/or docked to the simulation device 300, such that the separate device becomes a part of the simulation device 300. For example, the separate device may be a smartphone that provides the processor 310, the bus 315, the memory 320, the wireless transmitter 330, the microphone 340, sensors 350 or additional sensors, the camera 360, the display 370, and/or the wired communication interface 380, etc., and is inserted into and/or attached to the simulation device 300. As another example, the separate device may provide one or more additional components to be used with the components of the simulation device 300, such as additional processors, additional memory, additional display, additional sensors, additional cameras, additional microphones, additional communication interfaces, etc., for use with existing components of the simulation device 300.

While FIG. 1 depicts an example embodiment of a vapor simulation system including an e-vaping device, the vapor simulation system is not limited thereto, and may include additional and/or alternative architectures that may be suitable for the purposes demonstrated. For example, the vapor simulation system may include a plurality of additional or alternative elements, such as additional processing devices, interfaces, and memories.

Figure 2:
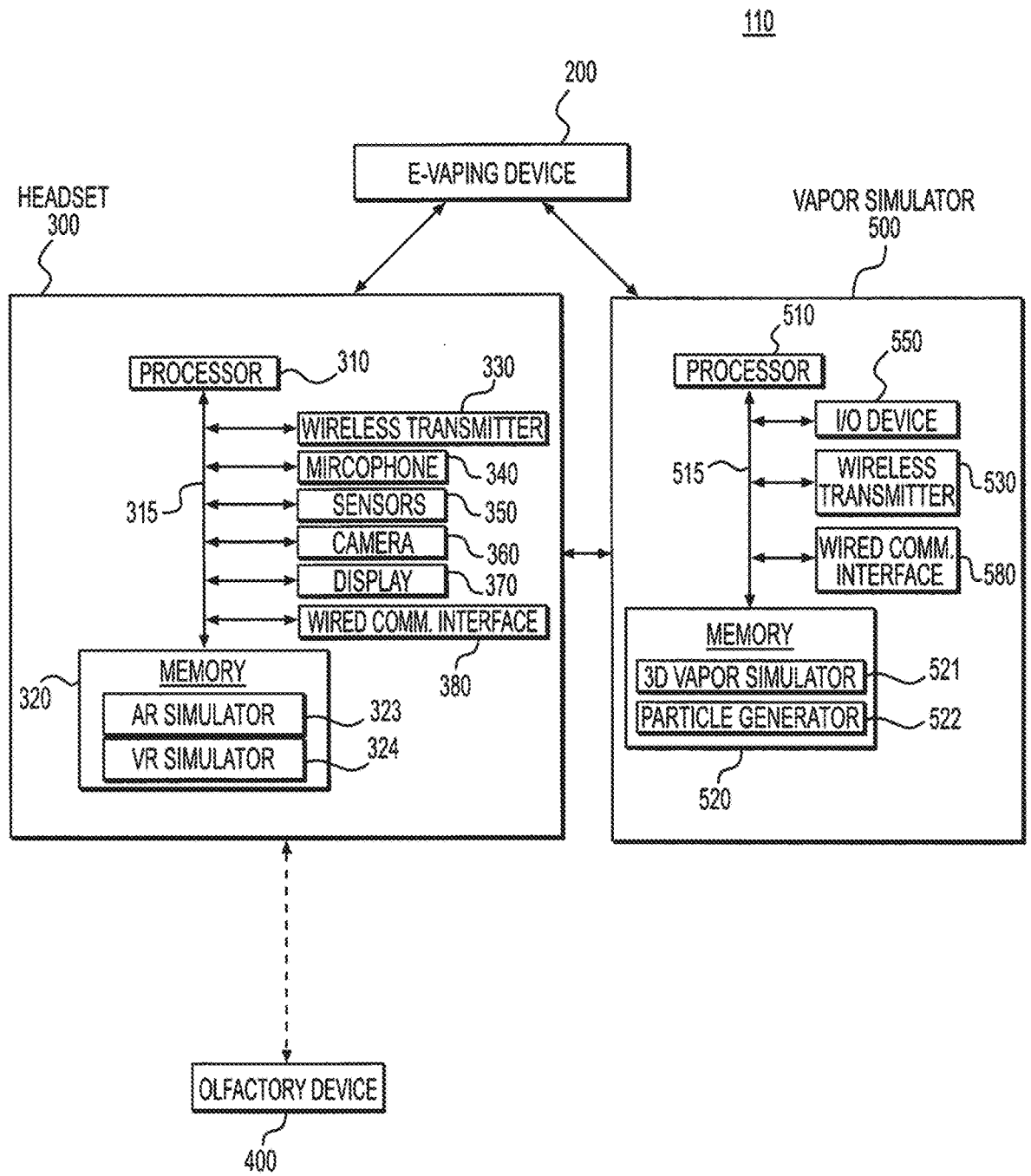
FIG. 2 illustrates a system for generating a vapor simulation using a dedicated computing device according to at least one example embodiment.

FIG. 2 illustrates a system for generating a vapor simulation using a dedicated computing device according to at least one example embodiment. In various example embodiments, the vapor simulation system 110 may include at least one e-vaping device 200, a wearable simulation device 300, an olfactory device 400, and/or a vapor simulator 500, but is not limited thereto. Description of components in the vapor simulation system 110 that are the same as components described in connection to FIG. 1 will be partially or completely omitted and the components may be assumed to the same or substantially similar characteristics and/or operation as the components described in connection with FIG. 1. Differences in some example embodiments between the vapor simulation system 100 and the vapor simulation system 110 will be described below.

According to at least one example embodiment, the vapor simulator 500 may include at least one processor 510, a communication bus 515, at least one memory 520, a wireless transmitter 530, a wired communication interface 580, and/or input/output (I/O) devices 550, but is not limited thereto. The memory 520 may include a three-dimensional (3D) vapor simulator routine 521 and/or a particle generator routine 522, but is not limited thereto. The memory 320 of the simulation device 300 may include the AR simulator routine 323, and/or the VR simulator routine 324, etc. However, the example embodiments are not limited thereto, and for example, the memory 520 of the vapor simulator 500 may store the 3D vapor simulator routine 521, the particle generator routine 522, the AR simulator routine 323, and the VR simulator routine 324 and may transmit the necessary real-time data to support the display of the AR simulation and/or the VR simulation by the simulation device 300. The vapor simulator 500 may pre-generate the 2D and 3D VR environments and transmit the VR environments to the simulation device 300 according to some example embodiments.

Moreover, due to various restraints (e.g., battery life, processing power, memory constraints, display screen resolutions, heat generation issues, etc.) related to the use of the simulation device 300 with regards to system 100, particularly in regards to the real-time collection of data regarding the drawing and ejection operation by the adult vaper, the real-time processing of the 3D vapor simulation and the particle generation, and the real-time AR simulation and VR simulation, the visual quality of the AR simulation and/or the VR simulation of the system 100 may be improved upon. Accordingly, in vapor simulation system 110, some or all of the AR and/or VR processing may be off-loaded and performed by a dedicated computing device, such as the vapor simulator 500. The vapor simulator 500 may be a PC, a laptop, a server, a gaming console, a distributed computing system, a cloud processing system, a smartphone, a tablet, etc., that has the greater processing capability and memory storage capability than the simulation device 300 alone. The vapor simulator 500 may connect to the simulation device 300 via a wired and/or wireless connection using the wireless transmitter 530 and/or the wired communication interface 580, and may be located in the same physical location as the simulation device 300, or may be located in a different physical location. Additionally, the vapor simulator 500 may also include one or more I/O devices 550, such as a keyboard, mouse, microphone, speakers, display screen, projector, sensors, cameras, etc., and/or be connected to one or more I/O devices 550 via a wired and/or wireless connection, that may be used to perform the calculations necessary for the AR and/or VR simulations. For example, the vapor simulator may be used to perform calibration of the vapor simulation system (e.g., 100 or 110), by recording and measuring the adult vaper (and/or test adult vapers) vaping with an e-vaping device and creating an audio signature and/or template of the vapor ejection characteristics of the adult vaper. This information and/or data may be loaded onto the adult vaper's personal profile for use with the vaping simulation. Additionally, other adult vaper preferences may be loaded onto the personal profile, such as selection of pre-generated and or adult vaper generated 3D VR environments, olfactory preferences, social media account information, social media sharing preferences, contact information for friends of the adult vaper, AR and/or VR graphics preferences, etc.

According to some example embodiments, the personal profile data of the adult vaper may be selected using the camera 360 of the simulation device 300, or an external camera associated with the vapor simulator 500 (not shown), and capturing at least one image of the adult vaper and verifying the identity of the adult vaper based on the captured image (e.g., using facial recognition of the adult vaper, etc.). Additionally, other adult vaper specific biometric information may be used to verify the adult vaper's identity, such as a fingerprint scanner, voice identification, retina identification, etc., and/or a username and password, PIN code, etc., may be used to verify the adult vaper's identity. Once the adult vaper's identity has been verified, the personal profile information of the adult vaper may be loaded into the vapor simulator 500 and/or the simulation device 300. Moreover, the adult vaper identity verification functions may also be used to perform age verification of the adult vaper and ensure that the adult vaper is legally permitted to operate the e-vaping device 200 and/or the simulation device 300. If the age verification and/or identity verification fail, the adult vaper may be blocked from operating the e-vaping device 200 and/or the simulation device 300 by a command sent by the vapor simulator 500 and/or the simulation device 300.

While FIG. 2 depicts an example embodiment of a vapor simulation system including an e-vaping device and a vapor simulator, the vapor simulation system is not limited thereto, and may include additional and/or alternative architectures that may be suitable for the purposes demonstrated. For example, the simulation device 300 and/or the vapor simulator 500 may include a plurality of additional or alternative elements, such as additional processing devices, interfaces, and memories.

FIG. 3A is a side view of an e-vaping device according to at least one example embodiment. In at least one example embodiment, as shown in FIG. 3A, an electronic vaping device (e-vaping device) 60 may include a replaceable cartridge (or first section) 70 and a reusable battery section (or second section) 72, which may be coupled together at a threaded connector 205. It should be appreciated that the connector 205 may be any type of connector, such as a snug-fit, detent, clamp, bayonet, and/or clasp, etc. The first section 70 may include a housing 6 and the second section 72 may include a second housing 6'. The e-vaping device 60 includes a mouth-end insert 8. The end (i.e., tip) of the housing 6 where the mouth-end insert 8 is positioned may be referred to as the "mouth-end" or "proximal-end" of the e-vaping device 60. The opposite end of the e-vaping device 60 on the second housing 6' may be referred to as the "connection-end," "distal-end," "battery-end" or "front tip" of the e-vaping device 60.

In at least one example embodiment, the housing 6 and the second housing 6' may have a generally cylindrical cross-section, but is not limited thereto. In other example embodiments, the housings 6, 6' may have a generally triangular cross-section along one or more of the first section 70 and the battery section 72, etc.

FIG. 3B is a cross-sectional view along line IIIB-IIIB of the e-vaping device of FIG. 3A.

In at least one example embodiment, as shown in FIG. 3B, the first section 70 may include a reservoir 345 configured to contain a substance, such as a pre-vapor formulation, dry herbs, essential oils, etc., and a heater 14 that may vaporize the substance, which may be drawn from the reservoir 345 by a wick 28.

In at least one example embodiment, the pre-vapor formulation is a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or vapor formers such as glycerin and propylene glycol.

In at least one example embodiment, the first section 70 may include the housing 6 extending in a longitudinal direction and an inner tube (or chimney) 62 coaxially positioned within the housing 6.

At an upstream end portion of the inner tube 62, a nose portion 61 of a gasket (or seal) 15 may be fitted into the inner tube 62, while an outer perimeter of the gasket 15 may provide a seal with an interior surface of the outer housing 6. The gasket 15 may also include a central, longitudinal air passage 20, which opens into an interior of the inner tube 62 that defines a central channel 21. A transverse channel 33 at a backside portion of the gasket 15 may intersect and communicate with the air passage 20 of the gasket 15. This transverse channel 33 assures communication between the air passage 20 and a space 35 defined between the gasket 15 and a cathode connector piece 37.

In at least one example embodiment, the cathode connector piece 37 may include a threaded section for effecting the connection between the first section 70 and the battery section 72. In at least one example embodiment, more than two air inlet ports 44 may be included in the housing 6. Alternatively, a single air inlet port 44 may be included in the outer housing 6. Such arrangement allows for placement of the air inlet ports 44 close to the connector 205 without occlusion by the presence of the cathode connector piece 37. This arrangement may also reinforce the area of air inlet ports 44 to facilitate precise drilling of the air inlet ports 44.

In at least one example embodiments, the air inlet ports 44 may be provided in the connector 205 instead of in the outer housing 6.

In at least one example embodiment, the at least one air inlet port 44 may be formed in the outer housing 6, adjacent the connector 205 to minimize the chance of an adult vaper's fingers occluding one of the ports and to control the resistance-to-draw (RTD) during vaping. In an example embodiment, the air inlet ports 44 may be machined into the housing 6 with precision tooling such that their diameters may be closely controlled and replicated from one e-vaping device 60 to the next during manufacture.

In at least one example embodiment, a nose portion 93 of a downstream gasket 10 may be fitted into a downstream end portion 81 of the inner tube 62. An outer perimeter of the gasket 10 may provide a substantially tight seal with an interior surface 97 of the housing 6. The downstream gasket 10 may include a central channel 63 disposed between the inner passage 21 of the inner tube 62 and the interior of a mouth-end insert 8, which may transport the vapor from the inner passage 21 to the mouth-end insert 8.

During vaping, pre-vapor formulation, or the like, may be transferred from the reservoir 345 to the proximity of the heater 14 via capillary action of the wick 28. The wick 28 may include at least a first end portion and a second end portion, which may extend into opposite sides of the reservoir 345. The heater 14 may at least partially surround a central portion of the wick 28 such that when the heater 14 is activated, the pre-vapor formulation (or the like) in the central portion of the wick 28 may be vaporized by the heater 14 to form a vapor.

In at least one example embodiment, the heater 14 may include a wire coil which at least partially surrounds the wick 28. The wire may be a metal wire and/or the heater coil may extend fully or partially along the length of the wick 28. The heater coil may further extend fully or partially around the circumference of the wick 28. In some example embodiments, the heater coil 14 may or may not be in contact with the wick 28.

In at least one example embodiment, the heater 14 may heat pre-vapor formulation (or the like) in the wick 28 by thermal conduction. Alternatively, heat from the heater 14 may be conducted to the pre-vapor formulation (or the like) by means of a heat conductive element or the heater 14 may transfer heat to the incoming ambient air that is drawn through the e-vaping device 60 during vaping, which in turn heats the pre-vapor formulation (or the like) by convection.

It should be appreciated that, instead of using a wick 28, the heater 14 may include a porous material which incorporates a resistance heater formed of a material having an electrical resistance capable of generating heat quickly.

In at least one example embodiment, as shown in FIG. 3B, the second section 72 of the e-vaping device 60 may include a puff sensor 16 (e.g., a pressure sensor, a flow sensor, etc.) responsive to air drawn into the second section 72 via an air inlet port 44a adjacent a free end or tip of the e-vaping device 60. The second section 72 may also include a power supply 1.

Additionally, the second section 72 of the e-vaping device 60 may include a controller 45 and a battery monitoring unit (BMU) (not shown). In some example embodiments, the second section 72 may also include an external device input/output interface (not shown). The I/O interface may be a Bluetooth interface, for example.

The controller 45 includes a microprocessor, a non-transitory computer-readable storage medium, a heater control circuit, and/or a charge control circuit and may be connected to the puff sensor 16.

The controller 45 performs features of the second section 72, as well as the entire e-vaping device 60, such as controlling the heater, interfacing with an external charger and monitoring the pressure within the e-vaping device 60 to determine whether an adult vaper has applied a negative pressure. Moreover, the controller 45 may determine whether an adult vaper has applied a positive pressure for a threshold time. In such an instance, the controller 45 may place the e-vaping device 60 in a disabled and/or hibernation mode (reduced power consumption and/or preventing activation).

The controller 45 may be hardware, firmware, hardware executing software or any combination thereof. When the controller 45 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the controller 45.

In the event where the controller 45 is at least one processor executing software (e.g., computer readable instructions), the controller 45 is configured as a special purpose machine to execute the software, stored in the non-transitory computer-readable storage medium, to perform the functions of the controller 45.

Upon completing the connection between the first section 70 and the second section 72, the power supply 1 may be electrically connectable with the heater 14 of the first section 70 upon actuation of the puff sensor 16. Air is drawn primarily into the first section 70 through one or more air inlets 44, which may be located along the housing or at the connector 205.

The power supply 1 may include a battery arranged in the e-vaping device 60. The power supply 1 may be a Lithium-ion battery or one of its variants, for example a Lithium-ion polymer battery. Alternatively, the power supply 1 may be a nickel-metal hydride battery, a nickel cadmium battery, a lithium-manganese battery, a lithium-cobalt battery or a fuel cell. The e-vaping device 60 may be usable by an adult vaper until the energy in the power supply 1 is depleted or a minimum voltage cut-off level is achieved.

In at least one example embodiment, the power supply 1 may be rechargeable and may include circuitry configured to allow the battery to be chargeable by an external charging device. To recharge the e-vaping device 60, an USB charger or other suitable charger assembly may be used in connection with a charging interface (not shown). Additionally, a host interface (not shown) configured to communicate with an external computing device (e.g., the wearable simulation device 300 (e.g., the vapor simulation headset), the vapor simulator computing device 500, etc.) using wired and/or wireless communications may also be included in the housing of the power supply 1.

Furthermore, the puff sensor 16 may be configured to sense an air pressure drop and initiate application of voltage from the power supply 1 to the heater 14. The puff sensor 16 may also activate input/output (I/O) devices, such as a heater activation light 48 that is configured to glow when the heater 14 is activated. The heater activation light 48 may include a light-emitting diode (LED) and may be at an upstream end of the e-vaping device 60. Moreover, the heater activation light 48 may be arranged to be visible to an adult vaper during vaping. In addition, the heater activation light 48 may be utilized for e-vaping system diagnostics or to indicate that recharging is in progress. The heater activation light 48 may also be configured such that the adult vaper may activate and/or deactivate the heater activation light 48 for privacy. The heater activation light 48 may be on a tip end of the e-vaping device 60 or on a side of the housing 6.

In at least one example embodiment, the at least one air inlet 44a may be located adjacent the puff sensor 16, such that the puff sensor 16 may sense air flow indicative of an adult vaper taking a puff and activates the power supply 1 and the heater activation light 48 to indicate that the heater 14 is working. The heater activation light 48 may be located at and/or on the tip end of the e-vaping device. In other example embodiments, the heater activation light 48 may be located on a side portion of the housing 6.

In at least one example embodiment, the first section 70 may be replaceable. In other words, once the pre-vapor formulation, or other contents, of the cartridge is depleted, only the first section 70 may be replaced. An alternate arrangement may include an example embodiment where the entire e-vaping device 60 may be disposed once the reservoir 345 is depleted. Additionally, according to at least one example embodiment, the first section 70 may also be configured so that the contents of the cartridge may be re-fillable.

While FIGS. 3A and 3B depict example embodiments of an e-vaping device, the e-vaping device is not limited thereto, and may include additional and/or alternative hardware configurations that may be suitable for the purposes demonstrated. For example, the e-vaping device may include a plurality of additional or alternative elements, such as additional or alternative heating elements, reservoirs, batteries, etc. Additionally, while FIGS. 3A and 3B depict the example embodiment of the e-vaping device as being embodied in two separate housing elements, additional example embodiments may be directed towards an e-vaping device arranged in a single housing, and/or in more than two housing elements.

Figure 4:
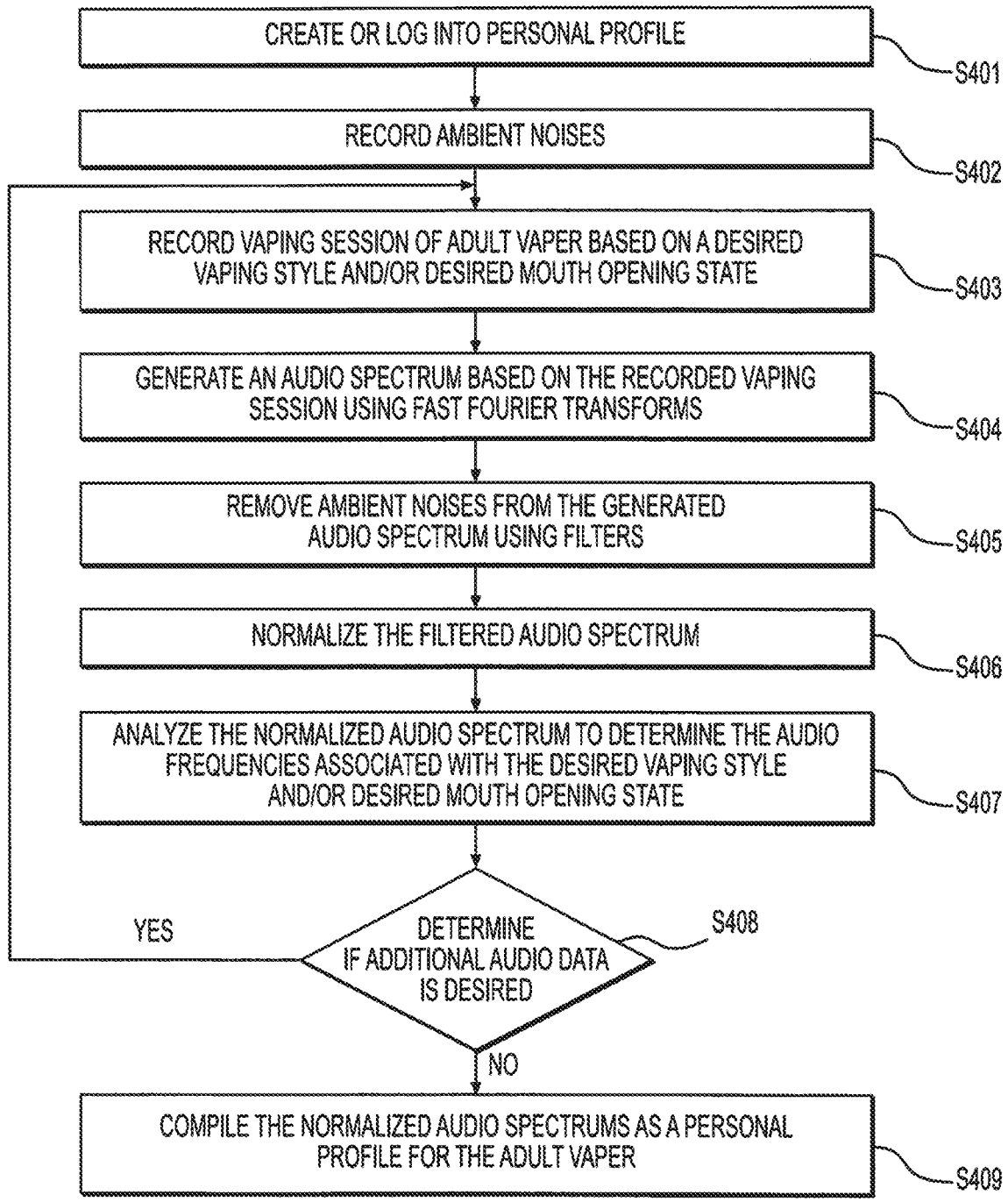
FIG. 4 illustrates a method for generating at least one audio signature associated with an adult vaper according to at least one example embodiment.

FIG. 4 illustrates a method for generating at least one audio signature associated with an adult vaper according to at least one example embodiment. FIGS. 8A to 8F illustrate example waveforms associated with the methods of FIGS. 4, 5A, and 5B according to some example embodiments.

According to at least one example embodiment, in operation S401, the adult vaper may create a personal profile for use with the vapor simulation system using at least one computing device, such as a personal computer, a laptop, a smartphone, a tablet, a server, etc.). According to at least one example embodiment, the computing device may be the simulation device 300, the vapor simulator 500, a separate computing device, etc. The personal profile may include personal information related to the adult vaper for use in verifying the identity and/or age of the adult vaper, such as the adult vaper's real name, personal address, email address, phone number, age, gender, occupation, biometric information of the adult vaper, such as fingerprint data, retinal data, facial data, voice imprint, etc., username, and/or password, that may be used to verify and/or authenticate the adult vaper. The personal profile may also include additional information related to the adult vaper, such as the adult vaper's AR and/or VR preference settings, the adult vaper's e-vaping preference settings, e-vaping devices that have been associated with and/or paired with the vapor simulation system, social media account information that the adult vaper intends to communicate with and/or associate with the vapor simulation system, contact list information for connecting with other adult vaper's vapor simulation system profiles, etc. According to some example embodiments, if the adult vaper has previously created a personal profile, the adult vaper may log into the personal profile by authenticating and/or verifying his or her identity, for example by entering his or her username and password, biometric information, etc.

In operation S402, a recording is made of ambient noises present in a recording space that does not include audio related to an adult vaper vaping is recorded using at least one computing device, such as a personal computer, a laptop, a server, a smartphone, a tablet, etc., and an audio input device (e.g., a microphone, etc.). According to at least one example embodiment, the computing device may be the simulation device 300, the vapor simulator 500, a separate computing device, etc. For example, the recording of the ambient noises may be recorded prior to, during, and/or subsequent to, a recording session of the adult vaper vaping, so long as the recording of the ambient noises do not include the recording of audio associated with the adult vaper vaping. The recording of the ambient noise is preferably recorded in the same space (e.g., a recording studio, room, outdoor area, etc.) that the audio signature of the adult vaper is to be recorded, but is not limited thereto.

In operation S403, a vaping session of the adult vaper is recorded using the at least one computing device, e.g., the simulation device 300, the vapor simulator 500, a separate computing device, etc., and an audio input device (e.g., a microphone, etc.), which may be part of the simulation device 300, the vapor simulator 500, and/or separate device. According to at least one example embodiment, the adult vaper may engage in a desired vaping style and/or desired mouth opening state for the vaping session. For example, the adult vaper may record a plurality of vaping sessions wherein the adult vaper is engaged in different vaping styles. For example, recordings may include the adult vaper ejecting a normal amount of drawn vapor, ejecting a large amount of drawn vapor, ejecting a lesser amount of drawn vapor, the adult vaper ejecting using a normal ejection velocity, using a low ejection velocity, using a high ejection velocity, etc. Moreover, the adult vaper may also record vaping sessions based on different mouth opening states (e.g., ejecting vapor out of the left corner of the adult vaper's mouth, ejecting vapor out of the right corner of the adult vaper's mouth, etc.).

Figure 8A:
FIGS. 8A to 8F illustrate example waveforms associated with the methods of FIGS. 4 and 5B according to some example embodiments.

In operation S404, the computing device in certain example embodiments generates an audio spectrum using fast Fourier transforms (FFT) and audio signal processing based on the recorded audio signals of the vaping session (e.g., the audio signals of the adult vaper ejecting vapor in the desired vaping style and/or ejecting vapor based on the desired mouth opening state). FIG. 8A is an illustration of an example waveform of the recorded vaping session audio spectrum. At this stage, the recorded audio signals are considered an unbiased audio spectrum that may include ambient noises (e.g., background noises and/or undesired noises, etc.) that are unrelated to audio relevant to the vaping session of the adult vaper.

In operation S405, the computing device filters the ambient noises (e.g., removes, subtracts, etc.) out of the unbiased audio spectrum using the recording of the ambient noises created in S402, such that the recorded audio signals related to the vaping session remain. The computing device may filter the ambient noises based on previously determined frequencies of the ambient noises from recordings of vaping sessions that are known to not include ambient noises (e.g., the recording created in S402), and/or audio frequency ranges that are known to not be associated with a vaping session based on experimental data, and subtracting the audio frequency ranges associated with the ambient noises from the unbiased audio spectrum in order to filter out the ambient noises. The filtering of the ambient noises may be conducted using well-known techniques.

Figure 8B:
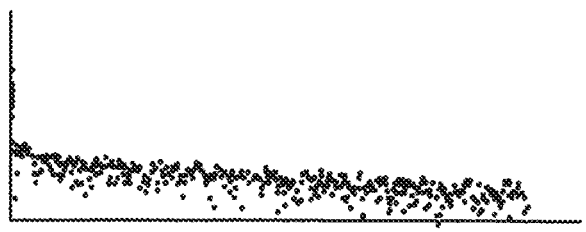

For example, FIG. 8B is an illustration of an example waveform of the unbiased audio spectrum of the ambient noises that may have been previously recorded, simultaneously recorded, subsequently recorded, separately recorded, etc., with the vaping session recording by the computing device that is known to not include audio signals related to the ejection of drawn vapor (e.g., a recording of the adult vaper's environment when the adult vaper is not engaging in a vaping session). The computing device may determine frequencies associated with the ambient noises based on the waveform of the unbiased audio spectrum of the ambient noises. Additionally, according to some example embodiments, the computing device may determine the frequencies associated with the ambient noises based on experiential data. Once the computing device has performed the removal of the ambient noises from the generated audio spectrum in operation S405, a waveform such as the example in FIG. 8C, may be generated by the computing device.

Figure 5A:
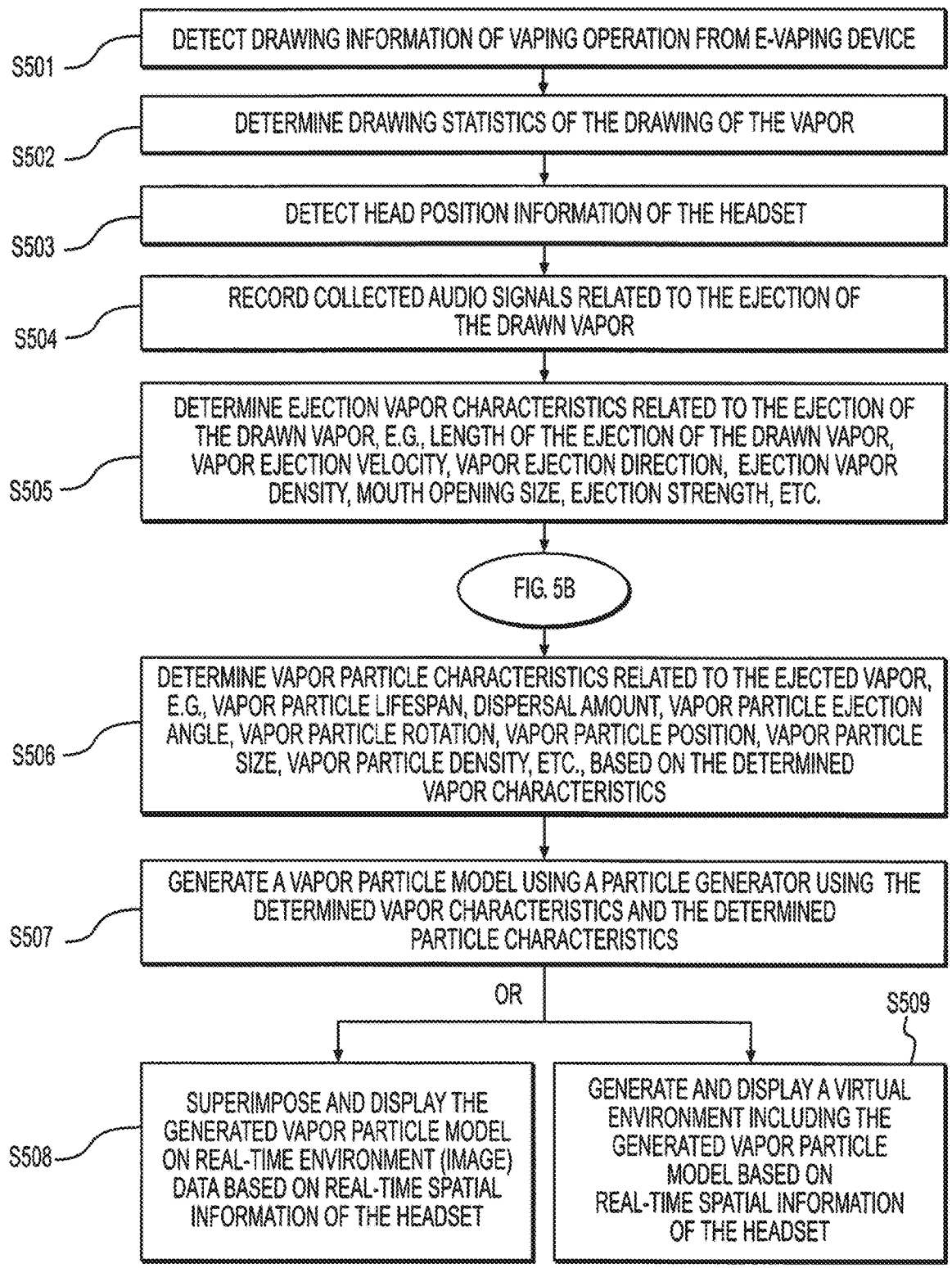
FIG. 5A illustrates a method for generating a vapor simulation according to at least one example embodiment.

In operation S406, the filtered (e.g., biased audio spectrum) audio spectrum of the vaping session may be normalized based on a histogram from histogram values 0 to 1 in order to facilitate a comparison of the recorded vaping session with future (e.g., real-time) recordings of the adult vaper vaping, such as the collected vapor ejection audio signals of S504 of FIG. 5A. FIG. 8D is an illustration of an example waveform of the normalized audio spectrum.

Next, in S407, the computing device analyzes the normalized audio spectrum to determine the audio frequencies (and/or frequency ranges) that are associated with the desired vaping style and/or desired mouth opening state of the adult vaper for the recorded vaping session. The analysis of the normalized audio spectrum by the computing device may include determining the audio frequencies and/or frequency ranges that are most prevalent and/or distinguish the recording of the desired vaping style and/or desired mouth opening state from other vaping styles and/or mouth opening states within a desired degree of confidence. For example, the normalized audio spectrum may be compared to a baseline audio signature of the adult vaper engaging in a desired and/or default vaping session (e.g., the adult vaper vaping a normal amount of vapor for the adult vaper, and ejecting the vapor using a normal velocity for the adult vaper, and ejecting the vapor out of the center of the adult vaper's mouth, etc.), and comparing the audio frequencies of the desired and/or default vaping session with the normalized audio spectrum to determine distinguishing differences between the audio spectrums. Additionally, the normalized audio spectrum may be compared against other normalized audio spectrums associated with related desired vaping styles (e.g., normalized audio spectrums associated with faster or slower vaping ejection velocities, etc.) and/or desired mouth opening states (e.g., smaller or larger mouth opening states and/or ejecting vapor out of the left side or right side of the adult vaper's mouth, etc.). FIG. 8E is an example illustration of characteristic audio frequencies associated with a desired vaping style and/or desired mouth opening state. In S408, the computing device determines whether additional audio data is desired, for example, if additional audio recordings of the desired vaping style and/or desired mouth opening state are desired to satisfy a desired degree of confidence, to improve the quality of the audio signature of the desired vaping style and/or desired mouth opening state, etc., based on adult vaper input (e.g., the adult vaper indicates that additional vaping styles and/or mouth opening states audio signatures are desired), based on an administrator's input, based on review of the audio signatures recorded, and/or based on testing of the audio signatures and statistical analysis of the results of the testing.

For example, the computing device may generate tests for the adult vaper to perform; wherein the adult vaper may be requested to perform one or more vaping sessions corresponding to desired vaping styles and/or desired mouth opening states to determine if the recorded audio signatures can be used to detect the appropriate desired vaping style and/or desired mouth opening state. After the test or during the test, the adult vaper and/or the administrator may indicate whether the vaping style and/or mouth opening state determined by the computing device was correct. If the test results are satisfactory and/or correct, no additional data may be desired. If the test results are not satisfactory and/or incorrect, additional data may be desired. If additional data is desired, the method proceeds to S403. Optionally, if recordings of additional ambient noises and/or different ambient noises are desired, then the method proceeds to S402 instead. If no additional data is desired, the method proceeds to S409.

In operation S409, the computing device may compile and store one or more audio signatures (e.g., audio templates) associated with the adult vaper's desired vaping style and/or desired mouth opening in the personal profile associated with the adult vaper, along with other vaping preferences associated with the adult vaper's desired e-vaping device(s) (e.g., e-vaping device 200), software settings related to the AR and/or VR vapor simulation application, social media settings (e.g., account login information, etc.), identity information (e.g., biometric data, such as the adult vaper's fingerprints, voiceprints, facial recognition information, etc.), age verification information corresponding to the adult vaper, etc. For example, the computing device may generate a software file that includes the previously recorded audio signatures and/or audio templates (e.g., the audio signatures created in relation to operations S403 to S406) to create a complete audio signature of all of the various vaping styles of the adult vaper and store the audio signature as a part of the adult vaper's personal profile. The adult vaper personal profile may then be loaded into the simulation device 300 and/or the vapor simulator 500 for use in determining the vaping style and/or mouth opening state associated with a recording of the adult vaper, as discussed further with regards to FIGS. 5A and 5B.

Figure 5B:
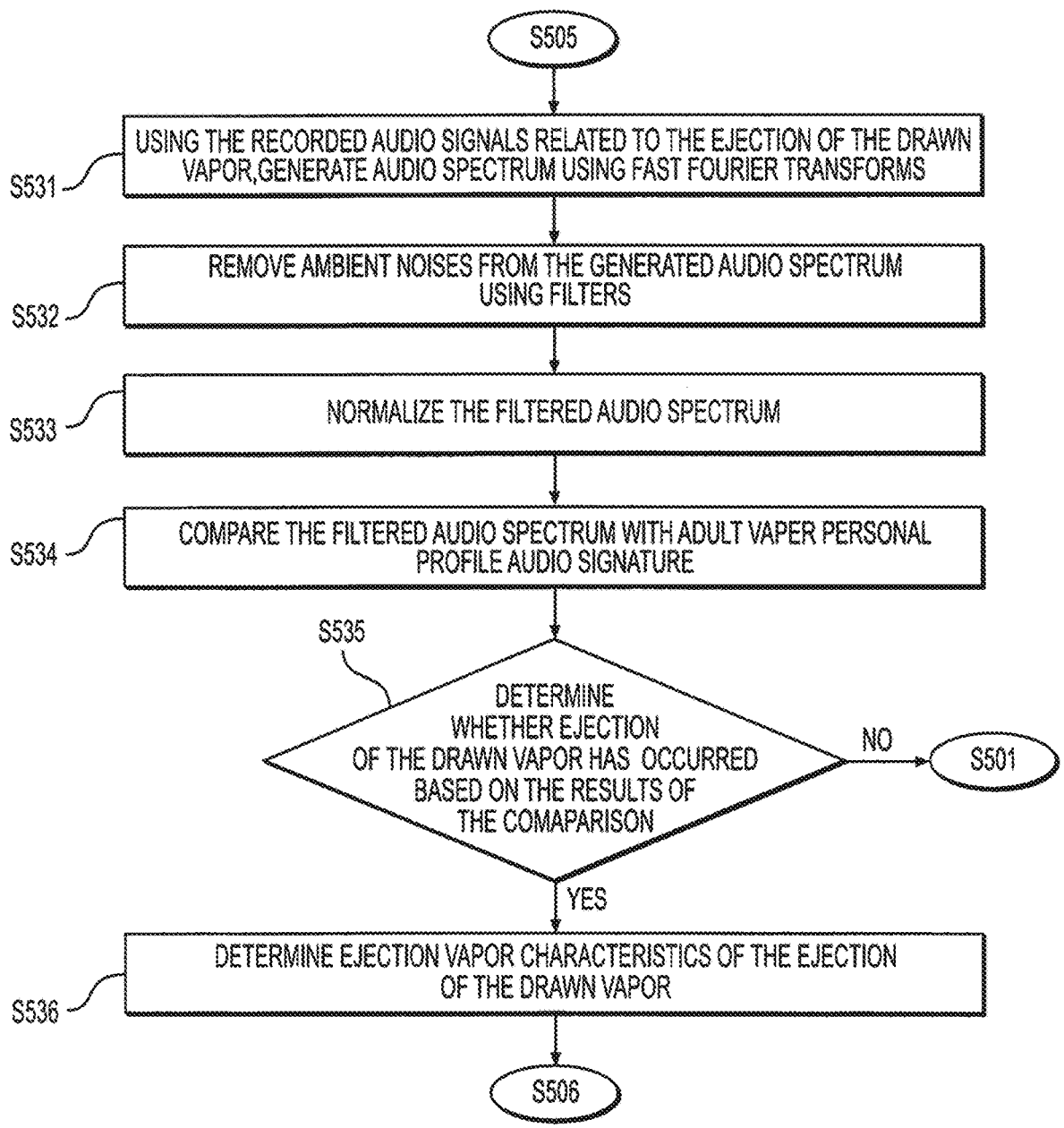
FIG. 5B illustrates a method for analyzing audio signals related to the drawn vapor to determine vapor characteristics related to the ejection of drawn vapor according to at least one example embodiment.
Figure 6A:
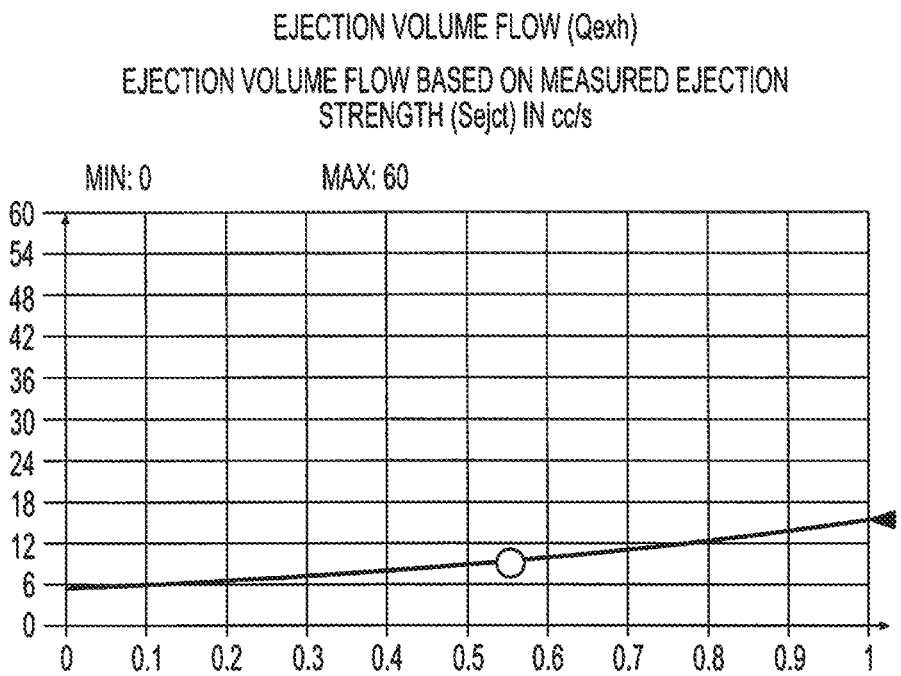
FIGS. 6A to 6J illustrate various example functions used to calculate vapor particle characteristics according to some example embodiments.
Figure 6B:
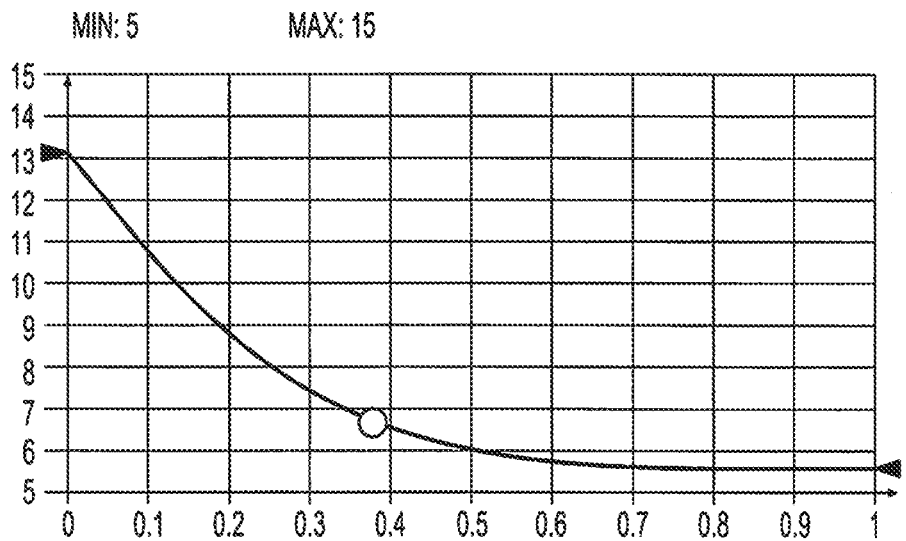
Figure 6C:
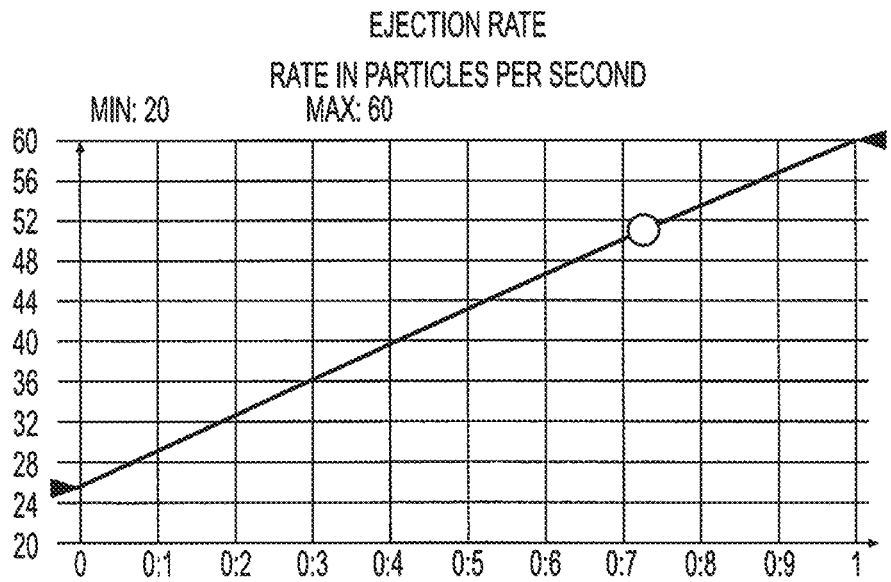
Figure 6D:
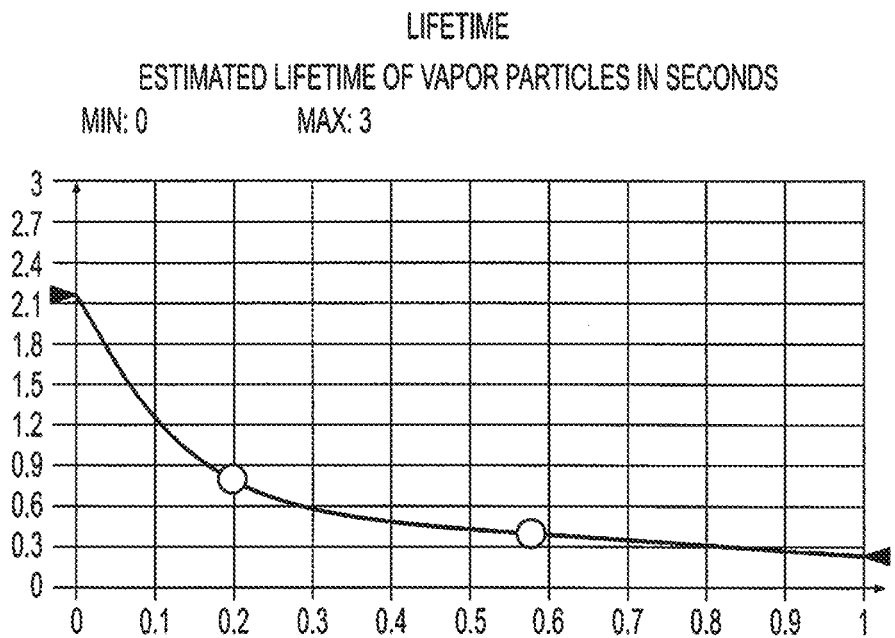
Figure 6E:
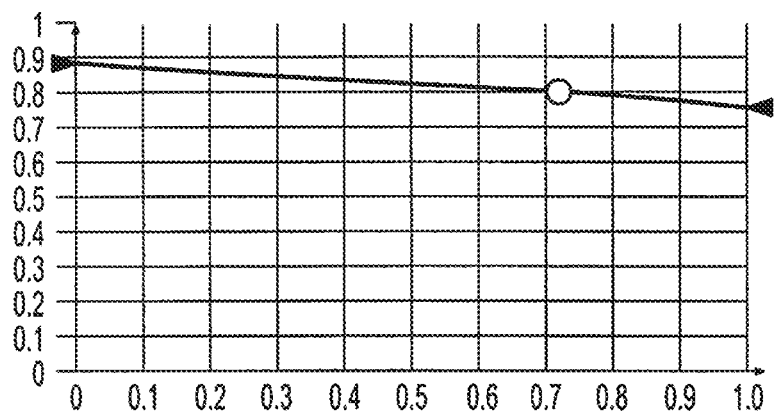
Figure 6F:
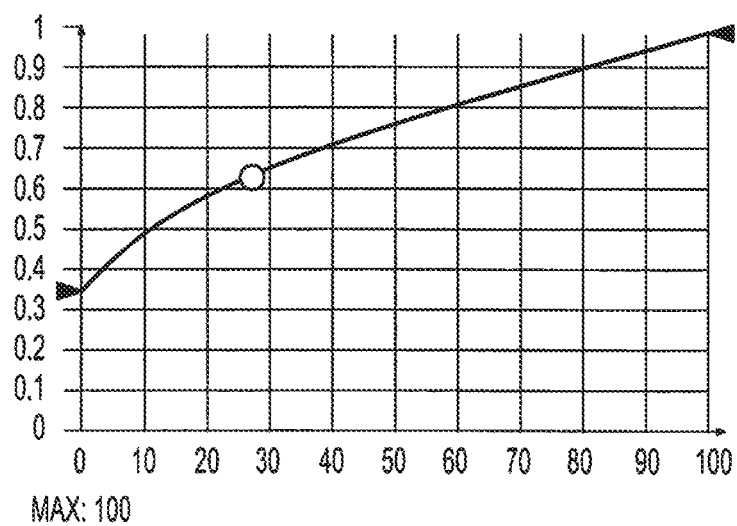
Figure 6G:
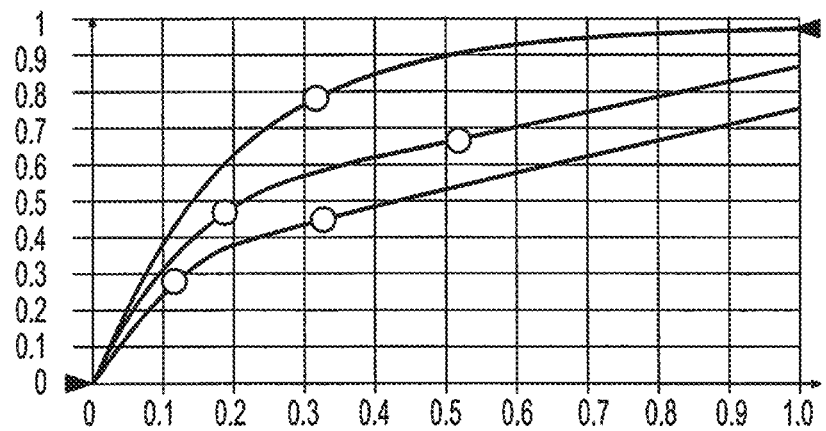
Figure 6H:
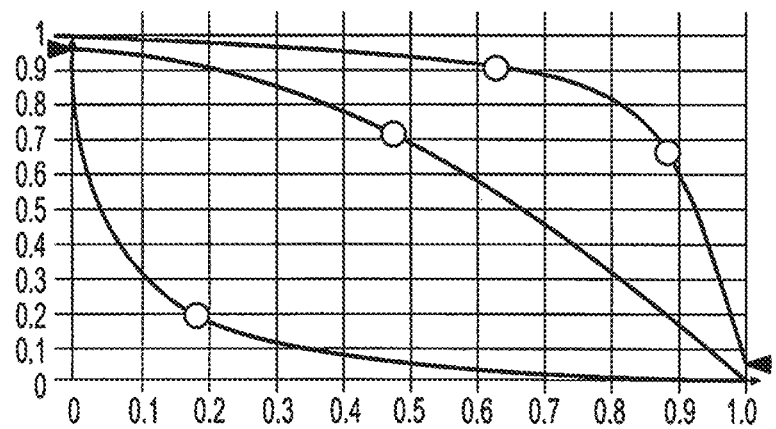
Figure 6I:
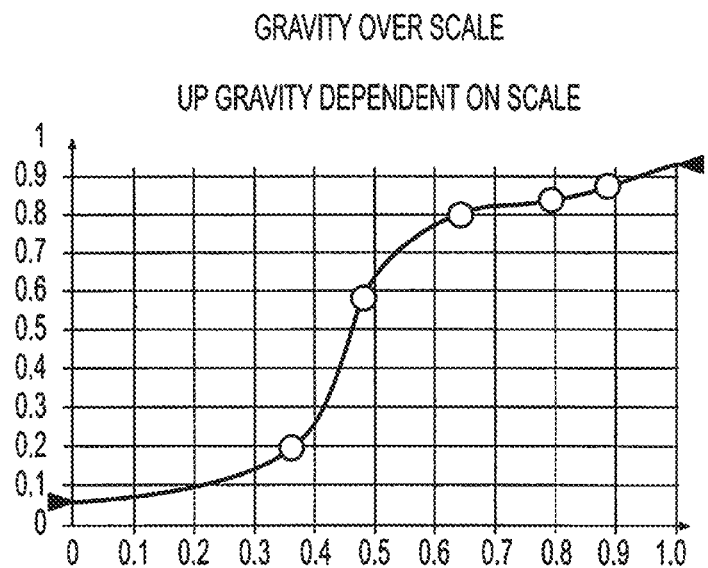
Figure 6J:
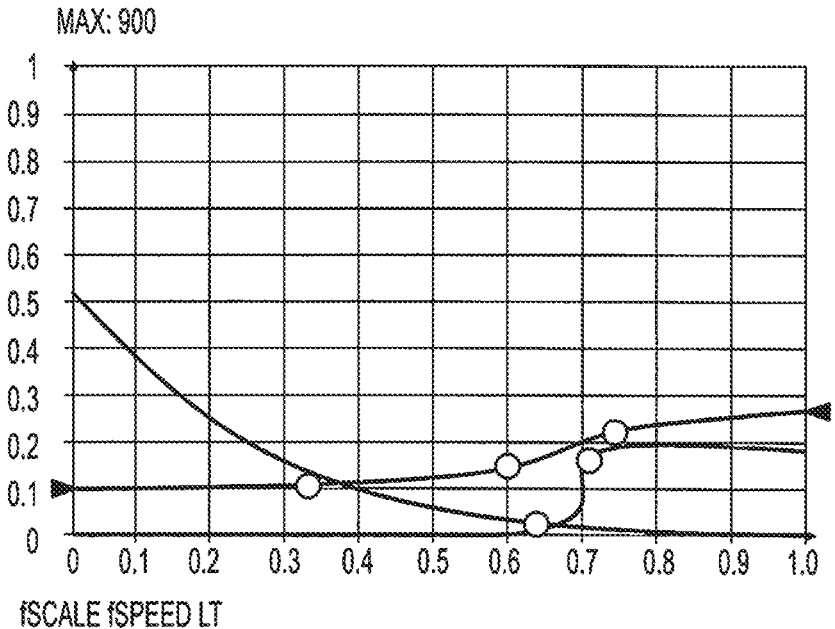

FIG. 5A illustrates a method for generating a vapor simulation according to at least one example embodiment. FIG. 5B illustrates a method for analyzing audio signals related to the drawn vapor to determine vapor characteristics related to the ejection of drawn vapor according to at least one example embodiment. FIGS. 6A to 6J illustrates various example functions used to calculate vapor particle characteristics according to some example embodiments.

Referring to FIG. 5A, according to some example embodiments, one or more adult vapers may connect or "pair" their e-vaping device 200 with a simulation device 300 that the adult vaper is wearing and/or otherwise utilizing (in some example embodiments, the connection or pairing may be to a smartphone that forms part of the simulation device 300, as described above). Once paired, in operation S501, the simulation device 300 receives and/or detects drawing information corresponding to the adult vaper's operation of the e-vaping device 200. For example, the e-vaping device 200 may transmit information related to the operation of the e-vaping device 200 by the adult vaper, such as the start time of a drawing of vapor from the e-vaping device 200, the stop time of a drawing of vapor from the e-vaping device 200, the amount of pressure exhibited by the drawing operation, the volume of vapor flow, etc., using various sensors, e.g., the puff sensor 16, etc., located on or attached to the e-vaping device 200, and/or from data transmitted by the controller 45 of the e-vaping device 200. Additionally, the camera 360 of the simulation device 300 (and/or an external camera connected to the simulation device 300 via a wired and/or wireless connection) may detect an I/O indicator located on the e-vaping device 200, such as the heater activation light 48, that indicates that the adult vaper has engaged the heater of the e-vaping device 200 and/or is drawing vapor from the e-vaping device 200.

Once the drawing information related to the adult vaper's drawing operation has been obtained by the simulation device 300, in operation S502, the simulation device 300 may determine and/or calculate drawing statistics related to the vaping operation, such as the length of time, volume of vapor, etc., of the actual vapor drawn by the adult vaper.

In operation S503, head position information related to the 3D spatial position of the adult vaper's head and/or eyes, and/or the 3D spatial position of the simulation device 300 (e.g., the direction that the adult vaper's head/body is facing, the direction that the simulation device 300 is facing, the position of the adult vaper's body and/or simulation device 300 in an environment and/or room, the adult vaper's field of view, etc.) is determined using an external camera(s) (e.g., such as standard video cameras, stereoscopic cameras, time-of-flight cameras, etc.) (not shown) and/or gyroscopes, accelerometers, and other position-related sensors included in the simulation device 300. The 3D spatial position information may be an absolute position or a relative position in reference to a specified origin point in the adult vaper's environment, a virtual 3D environment including a 3D virtual coordinate system for use in the vapor simulation, and/or the adult vaper's body and may be determined using well-known techniques.

In operation S504, vapor ejection audio signals and/or other data related to the ejection of the vapor by the adult vaper is collected and/or recorded using the microphone 340, the camera 360, and/or sensors located on the simulation device 300, vapor simulator 500, and/or the e-vaping device 200. In operation S505, the simulation device 300 and/or vapor simulator 500 may analyze the collected vapor ejection audio signals to determine ejection information of the vapor ejection operation, such as a start time of the ejection of the vapor, an end time of the ejection of the vapor, an ejected vapor volume, an ejected vapor velocity (or speed), and/or ejected vapor direction (absolute or relative), ejected vapor density, the adult vaper's mouth shape, size, etc., when ejecting the vaper, vapor ejection strength, etc. The calculation of the ejection information may be performed using the collected vapor ejection audio signals and previously recorded audio signatures associated with the personal profile of the adult vaper (e.g., the personal profile generated in S409 of FIG. 4). For example, the adult vaper may have previously recorded vapor ejection audio in a test environment and/or controlled environment to generate an audio signature and/or audio template related to the adult vaper's vaping style that is used by the simulation device 300 and/or the vapor simulator 500 to determine the ejection information of the ejected vapor. Additionally, the at least one vaping audio signature associated with the adult vaper may be used to calibrate the simulation device 300 and/or the vapor simulator 500. The audio analysis of the collected vapor ejection audio signals to determine vapor characteristics is discussed in greater detail in connection with FIG. 5B.

FIG. 5B illustrates a method for analyzing audio signals related to the drawn vapor to determine vapor characteristics related to the ejection of drawn vapor according to at least one example embodiment.

According to at least one example embodiment, in operation S531, a computing device (e.g., the simulation device 300, the vapor simulator 500, etc.) may record audio signals during the ejection of the drawn vapor the same as or similar to the audio signals recorded in operation S504 of FIG. 5A and/or S402 of FIG. 4. For example, the computing device may generate an audio spectrum of the recorded audio signal of the ejection of the drawn vapor using fast Fourier transforms (FFT) and audio signal processing, such as the example waveform of FIG. 8A. The computing device may use the recorded audio spectrum to indirectly determine various drawing information corresponding to the vapor drawn from the e-vaping device 200 based on the previously recorded audio signatures and/or audio templates associated with the adult vaper included in the adult vaper's personal profile by correlating (e.g., comparing, determining, matching, etc.) the current recorded audio spectrum with the audio signatures and/or audio templates stored in the adult vaper's personal profile. In other words, the computing device can use the recorded audio signals as a surrogate for the vapor drawn from the e-vaping device and vaping characteristics and/or properties of the drawn vapor may be calculated based on the surrogate audio signals. The recorded audio signals may be considered unbiased audio spectrum that include audio signals related to the adult vaper's ejection of the drawn vapor as well as ambient background noise.

Figure 8C:
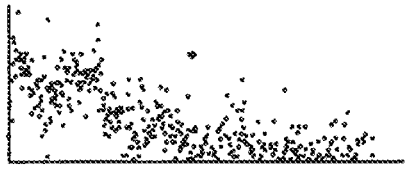
Figure 8D:
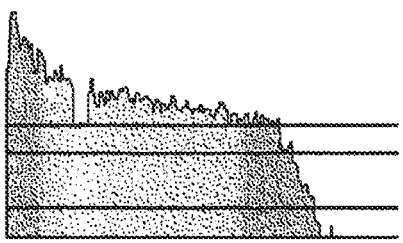
Figure 8E:
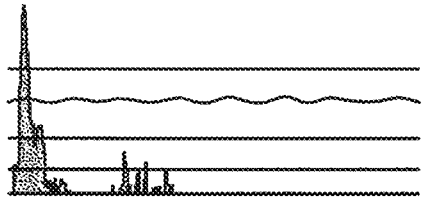
Figure 8F:
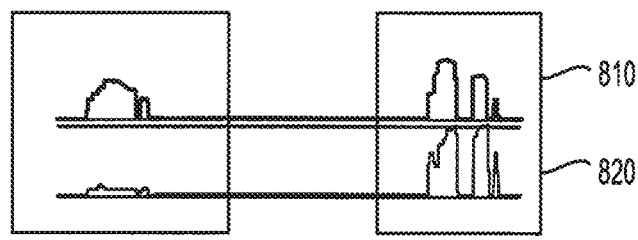

Next, in operation S532, the computing device may remove (e.g., subtract, filter, etc.) ambient background noise from the unbiased audio spectrum, thereby generating a filtered (e.g., biased) audio spectrum, such as the example waveform of FIG. 8C. The frequencies of the ambient background noise(s) may be determined based on previously recorded audio that is known to not contain audio signals related to ejection of drawn vapor (e.g., example waveform of FIG. 8B), or may be based on experiential data (not shown). In operation S533, the filtered (e.g., biased audio spectrum) audio signals are normalized based on a histogram from histogram values 0 to 1, such as the example waveform of FIG. 8D. According to some example embodiments, the biased audio spectrum is normalized to the same histogram as the audio signatures of the adult vaper's personal profile to facilitate analysis and/or comparison between the audio signatures of the adult vaper and the recorded audio spectrum. In operation S534, the computing device compares the recorded normalized audio signals against previously recorded audio signatures and/or audio templates stored in the personal profile of the adult vaper to determine the vaping style and/or mouth opening state associated with the ejection of the drawn vapor. In other words, the computing device matches, fits, associates (and/or generate results based on) the recorded normalized audio signal with at least one audio signature associated with the adult vaper. For example, the adult vaper's personal profile includes previously recorded audio signatures and/or templates (e.g., the characteristic audio frequencies) associated with the adult vaper performing a long, slow ejection of the drawn vapor, a short, strong ejection of the drawn vapor, ejection of the drawn vapor through a corner of the adult vaper's mouth, ejecting the drawn vapor to create vapor rings, etc., as discussed in connection with FIG. 4, and may form the audio signature related to the adult vaper's vaping style and/or mouth opening state. As an example, waveform 810 FIG. 8F illustrates an example audio signature associated with an adult vaper and waveform 820 of FIG. 8F illustrates an example recorded normalized audio signal associated with the adult vaper.

In operation S535, the computing device may correlate (e.g., compare, match, etc.) the audio signature(s) of the adult vaper included in the personal profile to the recorded normalized audio signals to determine whether enough (e.g., a threshold amount of) audio spectrum characteristics are present in the recorded normalized audio signal to determine whether (and/or confirm that) the adult vaper is performing an vapor ejection operation and determine that the recorded normalized audio signal is not a "false positive" recording of noise (e.g., ambient noise) that may not be related to the ejection of the drawn vapor. Examples of a false positive recording may be a recording of the adult vaper exhaling air, talking, etc. As another example, the computing device may determine that the recorded normalized audio signal does not include enough audio spectrum characteristics similar to the ejection of drawn vapor based on a comparison of the recorded normalized audio signal and the stored audio signatures of the personal profile, and therefore is not related to the ejection of drawn vapor by the adult vaper. The correlation (e.g., a statistical correlation, etc.) may include the determination that the recorded normalized audio signal does not match (e.g., data points of the recorded normalized audio signal is not statistically similar enough within a desired threshold value) data points of any of the audio signatures associated with the adult vaper's personal profile. Additionally, the computing device may also analyze the recorded normalized audio signal against generic audio templates associated with an "average" and/or "composite" adult vaper profile to determine whether the recorded normalized audio signal is related to the ejection of drawn vapor. For example, the generic audio template may be generated by the computing device based on an averaging of a plurality of adult vaper audio signatures, etc. As shown in example waveforms 810 and 820 of FIG. 8F, the computing device may determine that the noise recorded on the left side of waveform 810 does not match an audio signature of the adult vaper in comparison to the audio signature 820, but that the noise recorded on the right side of waveform 810 matches the audio signature 820 based on similarities of the characteristic audio frequencies of the two waveforms.

If the computing device determines that the adult vaper is not ejecting drawn vapor, the method returns to operation S501 of FIG. 5A. If the computing device determines that the adult vaper is ejecting drawn vapor, in operation S536, various ejection vapor characteristics of the ejected vapor are determined.

For example, the strength of the ejection (Sejct) may be calculated based on the following equation in at least one example embodiment:

$$\text{Sejct}=(\text{maxVal}-\text{Min})/(\text{Max}-\text{Min}) \text{ if maxVal}>\text{Min} \quad (1)$$

where maxVal=the maximum value encountered in the current histogram, Min=10% of the maximum encountered in the recorded templates for the adult vaper, and Max=110% of the maximum encountered in the recorded templates for the adult vaper, in at least one example embodiment.

Additionally, other vaping characteristics of the ejected vapor may be determined as well, such as the vapor ejection velocity, the direction of the ejection of the drawn vapor, the ejected vapor density, the shape of the adult vaper's mouth while ejecting the drawn vapor, various vapor flowtype measurements, such as the vapor flowrate, etc.

For example, physical constants related to the flow rate of a drawing operation and the dissipation of vapor during the drawing operation may be defined as desired constant values, e.g., 17.5 cc/s for the flow rate of the drawing operation and 3 cc/s for the vapor dissipation constant value, in at least one example embodiment. The physical constants may be determined based on experiments conducted by the adult vaper, based on average values of a plurality of adult vapers, etc. Using these defined constant values, a total volume of vapor for the ejection operation may be calculated using the following equations in at least one example embodiment:

$$\text{Vdrw}=\int \text{Sdrw}*\text{Cdrw } dt \quad (2)$$

$$\text{Vdiss}=\int \text{Cdiss } dt \quad (3)$$

$$\text{Vejct}=\int \text{bmQejct(Sejct)} dt \quad (4)$$

$$\text{Vsum}=\text{Vdrw}+\text{Vdiss}+\text{Vejct} \quad (5)$$

where Vdrw=the volume of vapor drawn during the drawing operation, Sdrw=the strength of the drawing operation, Cdrw=the constant value of the flowrate of the drawing operation, Vdiss=the volume of vapor dissipation during the drawing operation, Cdiss=the vapor dissipation constant value, Vejct=the total volume of ejected vapor during the ejection operation, bmQejct=the volumetric flowrate of the ejected vapor dependent on the area of the mouth opening of the adult vaper, Sejct=strength of the ejection operation, and Vsum=the total volume of all vapor drawn during operation of the e-vaping device by the adult vaper, according to at least one example embodiment.

Using the calculated variables above, ejected vapor characteristics may be determined. For example, the emission speed and the area (e.g., size) of the mouth opening of the adult vaper may be calculated using the following equations in at least one example embodiment:

$$\text{vVapor}=\text{Qejct}/\text{Amouth} \quad (6)$$

$$\text{Amouth}=\text{PI}*(\text{bmMouth(fMouth)}/2) \quad (7)$$

where vVapor=velocity of the ejected vapor, Qejct=volumetric flowrate of the ejected vapor, which may be a constant value, Amouth=the area of the mouth of the adult vaper, bmMouth=the width of the mouth opening of the adult vaper, and fMouth=the normalized mouth opening state of the adult vaper (e.g., the range may be from 0 and 1), according to at least one example embodiment.

As another example, the shape of the adult vaper's mouth during ejection may be determined based on comparison of the current histogram and the recorded audio templates of the personal profile associated with the various mouth shapes of the adult vaper (e.g., ejecting vapor from the left side of the mouth, right side of the mouth, while blowing vapor rings, etc.). Once a relevant match is found among the recorded audio templates, a weighted interpolation of the associated template mouth opening value is calculated using the following equations:

$$W_i=(\text{ErrorThres}-\text{Error}_i)/\text{Sum}(\text{ErrorThres}-\text{Error}_j) \text{ and} \quad (8)$$

$$\text{fMouth}=\text{Sum}(W_i*\text{fMouthTemplate}_i) \quad (9)$$

where ErrorThres is an error threshold value, $\text{Error}_i$ is the error rate of the weighted interpolation i, and $\text{Error}_j$ is the error rate of the current histogram. More specifically, the $\text{Error}_i$ and the $\text{Error}_j$ variables are error rate variables associated with the matching of each exhalation sound signal histogram against the recorded audio templates, according to at least one example embodiment.

Once the vaping characteristics of the ejected vapor have been calculated, the computing device transmits the vaping characteristics to the particle generator 322 (e.g., operation S506 of FIG. 5A) to determine the vapor particle characteristics for the 3D image vapor particle model, and the method for generating a vapor simulation according to FIG. 5A continues.

Referring back to FIG. 5A, once the ejected vapor characteristics (e.g., vaping characteristics) are determined, in operation S506, the particle generator 322 analyzes the ejected vapor characteristics to determine various vapor particle characteristics of the ejected vapor to be used to generate the vapor particle model for the AR and/or VR simulation. The particle generator 322 analyzes the ejected vapor characteristics to determine the vapor particle characteristics, such as the expected vapor particle lifespan for individual vapor particles, vapor dispersal amount, vapor particle ejection angle, vapor particle rotation, vapor particle 3D position (absolute or relative) in relation to the 3D virtual coordinate system of the 3D model (e.g., virtual coordinate information of the vapor particles), vapor particle size, vapor particle density, etc., based on the drawn and/or ejected vapor characteristics and previously experientially observed, collected, analyzed and modeled data regarding ejected vapor characteristics using mathematical equations, physical models related to ejected vapor characteristics, and/or well-known techniques.

Referring now to FIGS. 6A to 6J, FIGS. 6A to 6J illustrates various example functions used by the computing device to calculate the vapor particle characteristics for individual vapor particles (e.g., vapor particle characteristics) according to some example embodiments. The example functions may be used by the particle generator 322 to calculate values for various vapor characteristics for individual vapor particles (e.g., variables) using ejection vapor characteristics as inputs. The vapor particle characteristics may be included in a 3D vapor model, but the example embodiments are not limited thereto and may include additional functions and/or vapor characteristics and/or less functions and/or vapor characteristics for the generation of a 3D vapor model. For example, function 6A is an example model that may be used for determining the vapor ejection volume flow (Qejct) based on a determination of the measured ejection strength (Sejct) over time. The calculation of the measured ejection strength (Sejct) is discussed in greater detail in connection with FIG. 5A. Additionally, function 6B is an example model for determining the ejection angle of a vapor particle over time based on a calculated ejection velocity according to at least one example embodiment. Function 6C is an example model for determining an ejection rate in vapor particles per second based on a max ejection velocity of the vapor according to at least one example embodiment. Function 6D is an example model for calculating a lifetime of one or more individual vapor particles according to at least one example embodiment. Function 6E is an example model for calculating the density of the vapor particles over the velocity (e.g., speed) of the vapor particles. Function 6F is related to the calculation of the density of the vapor particles based on the volume of the drawn vapor by the adult vaper according to at least one example embodiment. Function 6G is an example function related to the calculation of the velocity scale factor over the lifetime of a vapor particle that is based on the dissipation rate of the vapor particle. Function 6H is an example model of the change in vapor scale over the lifetime of the vapor particle based on the ejection velocity of the vapor according to some example embodiments. Function 6I is an example model of the effect of gravity on the scale of the vapor particles over time according to at least one example embodiment. Function 6J illustrates an example model of the rotation speed range over the scale of the vapor particles according to some example embodiments. The various example models may be generated based on experiential data and/or user preferences (e.g., based on adult vaper preferences regarding the modeling of the 3D vapor particles) and are not limited to the illustrations shown in FIGS. 6A to 6J. Referring back to FIG. 5A, in operation S507, the 3D vapor simulator 321 receives the calculated vapor particle characteristics from the particle generator 322 and generates (e.g., generates once and/or continuously generates, calculates in real-time, etc.) a 3D image vapor particle model based on the vapor characteristics and/or the vapor particle characteristics. According to some example embodiments, the generated 3D image vapor particle model may include individually generated particles that each have individual particle model characteristics. The individual particles of the particle model may each have different particle lifespans, dispersal rates, ejection angles, rotations, positions, size, density, velocities, etc., based on the generated 3D image vapor particle model. For example, a generated vapor particle located on the outside of the generated vapor cloud model may have a slower velocity, shorter lifespan, greater ejection angle, greater ejection spin, etc., than a generated vapor particle located in the center of the generated vapor cloud model according to some example embodiments.

According to some example embodiments, the 3D vapor simulator 321 may generate a plurality of vapor particles (e.g., a vapor cloud) in real-time, pre-calculate, and/or on demand for each individual vapor particle based on the calculated vapor particle characteristics. For example, the vapor particle characteristics may include variables and/or parameters for each vapor particle of the 3D image vapor particle model, such as a velocity factor (rendering units/second), a scaling factor (particle scale/second), a rotation speed (degrees/second), a position (X, Y, Z coordinates/second) relative to the 3D virtual coordinate system of the 3D vapor particle environment, a density, etc. The parameters for each vapor particle may be set to a desired factor (e.g., velocity factor, scaling factor, etc.), set within a desired range (e.g., ejection angle, ejection rate, particle lifetime, ejection density, etc.), and/or calculated based on a generated function (e.g., a graph, curve, etc.) from experiential data associated with observed vapor characteristics. Additionally, various parameters (e.g., vapor particle size, vapor particle size change over time, density over scale/distance, gravity over scale/distance, rotation over scale/distance, etc.) may be input into a function (e.g., fit to a curve, etc.) based on the experiential data, such as recorded audio templates and/or audio signatures associated with the adult vaper, experiential data obtained through scientific observations of vapor characteristics, etc.

The 3D vapor simulator 321 may use the results of one or more of these vapor parameters may (in real-time) to determine the vapor characteristics as a function of time and/or distance, and/or subject to other variables (e.g., environmental variables), such as ambient air temperature, air turbulence, physical objects, etc., and may be used to generate the 3D vapor particle model. Additionally, according to some example embodiments, the 3D vapor simulator 321 may generate the 3D vapor particle model in real-time and/or continuously in order to generate and/or render the vapor particle images. The individual generated vapor particle images and/or the vapor cloud image may be rendered by the 3D vapor simulator 321 using vapor texture data associated with a desired vapor design (e.g., base images associated with various vapor designs) using well-known computer graphics techniques. For example, the vapor particle images and/or the vapor cloud image may be rendered using computer graphics rendering application programming interfaces (APIs) or AR/VR programing frameworks capable of generating images for AR and/or VR environments, such as DirectX, Direct3D, OpenGL, Vulkan, OpenVR, Unity, Unreal, etc.

Additionally, the desired vapor design may correspond to the actual formulation (e.g., pre-vapor formulation, pre-dispersion formulation, etc.) that is being heated and/or vaporized by the e-vaping device 200, a vapor design selected by adult vaper, etc. Elements of the vapor design that may be configured include the visual appearance of an individual vapor particle, the color of the individual vapor particle, the opacity/transparency of the individual vapor particle, etc.

Figure 7A:
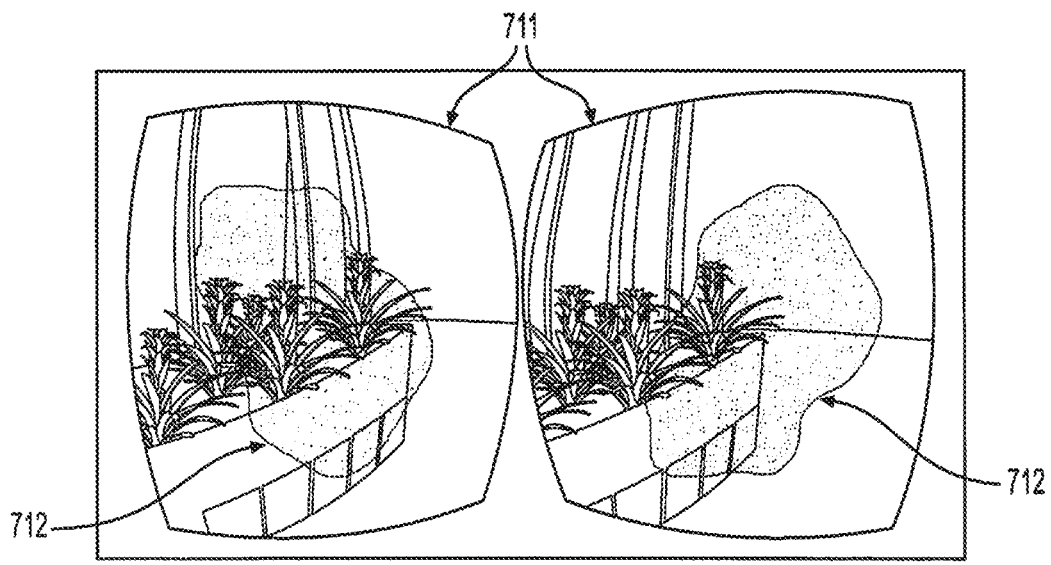
FIGS. 7A to 7C illustrate examples of an AR environment and VR environment with generated 3D vapor particle model superimposed on a stereoscopic display, according to some example embodiments.

Next, in operation S508, the 3D vapor simulator 321 provides and/or transmits the generated 3D vapor particle model to the AR simulator 323 and/or the VR simulator 324 based on the operation mode and/or hardware capabilities of the simulation device 300 for display by the simulation device 300. If the simulation device 300 is operating in AR mode (and/or is an AR headset or AR glasses), the AR simulator will superimpose the generated 3D vapor particle model on the real-time environment of the adult vaper as presented through the simulation device 300. In other words, using AR glasses as an example, the AR glasses may provide a clear unobstructed view of the adult vaper's present environment (e.g., the room or other physical space that the adult vaper is occupying). The generated 3D vapor particle model is then overlaid and/or projected onto the adult vaper's environment using the AR glasses as a 2D or 3D image on the AR glasses in real-time, with real-time and/or static modeling of the generated vapor particles and/or generated ejected vapor cloud. For example, FIG. 7A illustrates an example of an AR environment with a generated 3D vapor particle model superimposed on a stereoscopic display. Element 711 illustrates the real-time environment of the adult vaper in the left and right views of the stereoscopic display, e.g., display 370, and element 712 illustrates the generated 3D vapor cloud corresponding to the 3D vapor particle model. The AR simulator 323 may superimpose the 3D vapor particle model onto the AR environment using well-known techniques, such as using AR-related computer graphics APIs suitable for rendering AR environments, such as DirectX, OpenGL, etc.

Alternatively, according to some example embodiments, the 3D vapor simulator 321 may provide and/or transmit a pre-rendered vapor particle model to the AR simulator 323 and/or the VR simulator 324 (e.g., a static vapor particle model) and the pre-rendered vapor particle model may be super-imposed on the real-time environment of the adult vaper as presented through the simulation device 300 and/or a 2D or 3D VR environmental image as presented through the simulation device 300. The pre-rendered vapor particle model may include pre-rendered and/or static texture data and/or images of one or more vapor particles that comprise the vapor particle model without performing the real-time and/or continuous calculation of the 3D vapor particle model. The 3D vapor simulator 321 may provide the pre-rendered vapor particle model to the AR simulator 323 and/or the VR simulator 324 based on adult vaper preferences stored in the personal profile, software settings associated with the simulation device 300 and/or vapor simulator 500, and/or based on the hardware resources and/or hardware capability of the simulation device 300 and/or vapor simulator 500. For example, the 3D vapor simulator 321 may determine that the CPU and/or memory resources available on the simulation device 300 and/or vapor simulator 500 do not adequately support real-time generation of the 3D vapor particle model (e.g., generate the 3D vapor particle model sufficiently to support a desired display framerate for the AR and/or VR simulation, etc.), and therefore, may selectively transmit the pre-rendered vapor particle model to the AR simulator 323 and/or the VR simulator 324. The selective usage of the pre-rendered vapor particle model may be based on the real-time hardware resource allocation of the simulation device 300 and/or vapor simulator 500, and the 3D vapor simulator 321 may end the use of the pre-rendered vapor particle model when the 3D vapor particle model determines that the current hardware resource allocation of the AR simulator 323 and/or the VR simulator 324 can support the real-time generation of the 3D vapor particle model.

Further, the real-time head position (e.g., spatial information) of the adult vaper and/or the simulation device 300 (e.g., the position of the adult vaper's face, the position of the simulation device 300, the field of view, etc.) at the time of the actual ejection operation is taken into account in the real-time 3D position modeling of the generated vapor particles and the real-time simulated location of the generated vapor particles are presented in the AR image. For example, if the adult vaper at the time of the physical vapor ejection operation is looking straight ahead, but then turns his or her head while the vapor cloud is being ejected, the position of the generated 3D vapor particles in the AR image is updated to reflect that some or all of the 3D vapor particles may or may not still be in the adult vaper's field of view. Further, additional data may be collected of the adult vaper's environment, such as real-time camera images and/or real-time sensor readings of the adult vaper's environment (e.g., furniture, physical features, other adult vapers, wind currents, temperature, etc.) and the additional data may be input into the 3D position modeling in the 3D virtual coordinate system of the generated vapor particles and the generated vapor particles may be programmed to simulate interaction with the adult vaper's real-time environment as well (e.g., dispersing around physical objects in the environment, being affected by wind in the environment, simulating additional 3D vapor particles coming from the other adult vapers, etc.). Additionally, the simulation device 300 may act in a simulated AR mode, where the adult vaper may not be able to physically view his or her physical environment (e.g., when the simulation device 300 is an enclosed headset). The simulation device 300 may provide a real-time camera image (e.g., pass-through image) of the adult vaper's actual environment and overlay and/or project the AR simulation on top of the environment image.

Similarly, in operation S509, when the simulation device 300 is in the VR operation mode (e.g., the simulation device 300 is a VR headset), the adult vaper may be presented with a 2D or 3D VR environmental image. The environmental image may be a 2D or 3D photo or video of an environment that has been selected by the adult vaper and/or an environment of the adult vaper's choice, such as an ocean view from a ship, a mountain lodge, a beach scene, the inside of a space ship, a famous landmark (e.g., the top of the Eiffel Tower, on the Golden Gate Bridge, at the Tower of London, etc.) etc., a computer generated 2D or 3D image or model of the environment, and/or may be a computer generated virtualization of the adult vaper's current environment. The VR environmental image may be pre-generated by a computing device, such as the vapor simulator 500, the simulation device 300, and/or other computing device, and stored in the VR simulator 324, or maybe generated in real-time by the vapor simulator 500 and/or the simulation device 300. The VR simulator 324 may generate the VR environmental image and/or the 3D vapor particle model using well-known techniques, such as using VR-related computer graphics APIs suitable for rendering VR environments, such as DirectX, OpenGL, etc. The generated vapor particles may be inserted into the 2D or 3D VR environment, and the generated vapor particles may simulate the vapor ejection operation similar to the AR simulation discussed above.

Figure 7B:
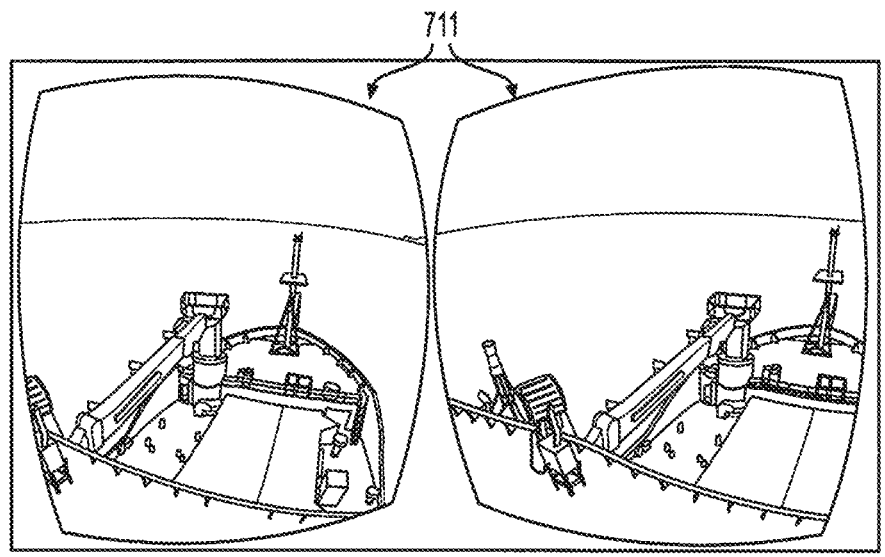
Figure 7C:
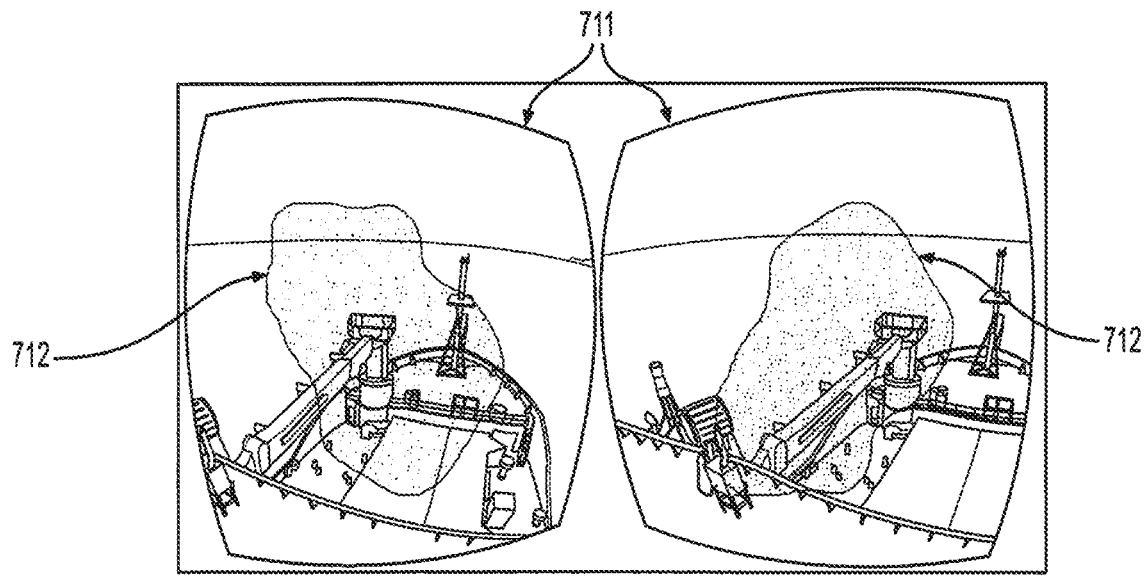

For example, FIG. 7B illustrates an environment for a VR simulation. As seen in FIG. 7B, the VR environment may be a photorealistic view of a ship, but the example embodiments are not limited thereto. FIG. 7C illustrates the 3D vapor particle model superimposed on the VR environment of FIG. 7B.

Additionally, the environment image may be set as a preference in the adult vaper's profile settings, or may be selected by the adult vaper during operation of the simulation device 300.

While various formulas have been provided above, the example embodiments are not limited thereto and other formulas and variable settings may be used to calculate the characteristics of the ejection of the drawn vapor and the particle characteristics.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electronic device, the electronic device comprising:
   a memory having stored thereon computer readable instructions and a plurality of personal profiles, the plurality of personal profiles corresponding to a plurality of adult vapers; and
   processing circuitry configured to execute the computer readable instructions to cause the electronic device to,
      receive identity verification information from a first adult vaper, determine a first personal profile corresponding to the first adult vaper from the plurality of personal profiles based on the identity verification information, and enable operation of an electronic vaping device based on the received identity verification information and the first personal profile.

2. The electronic device of claim 1, wherein the device is further caused to:

perform identity verification of the first adult vaper based on the received identity verification information and the first personal profile;

enable the operation of the electronic vaping device in response to the identity verification being performed successfully; and disable the operation of the electronic vaping device in response to the identity verification being performed unsuccessfully.

3. The electronic device of claim 2, wherein the device is further caused to perform the identity verification of the first adult vaper by:

determining an age of the first adult vaper using the first personal profile; and determining whether the first adult vaper is legally permitted to operate the electronic vaping device based on the determined age of the first adult vaper.

4. The electronic device of claim 1, wherein the identity verification information includes at least one of:

login information corresponding to the first adult vaper, a PIN code corresponding to the first adult vaper, biometric information corresponding to the first adult vaper, or any combinations thereof.

5. The electronic device of claim 1, wherein each the plurality of personal profiles includes at least one of:

a real name of the corresponding adult vaper, a personal address of the corresponding adult vaper, an email address of the corresponding adult vaper, a phone number of the corresponding adult vaper, age information of the corresponding adult vaper, gender information of the corresponding adult vaper, occupation information of the corresponding adult vaper, facial data of the corresponding adult vaper, fingerprint data of the corresponding adult vaper, retinal data of the corresponding adult vaper, facial data of the corresponding adult vaper, voice imprint of the corresponding adult vaper, or any combinations thereof.

6. The electronic device of claim 5, wherein each of the plurality of personal profiles further includes at least one of:

augmented reality preference settings associated with the corresponding adult vaper, virtual reality preference settings associated with the corresponding vaper, electronic vaping preference settings associated with the corresponding adult vaper, electronic vaping devices that have been associated with the corresponding adult vaper, social media account information associated with the corresponding adult vaper, contact list information associated with the corresponding adult vaper, or any combinations thereof.

7. The electronic device of claim 1, wherein the device is further caused to:

receive the identity verification information from at least one of a camera, a microphone, a finger print scanner, or any combinations thereof.

8. A method of operating an electronic device comprising:

receiving, using processing circuitry, identity verification information from a first adult vaper;

determining, using the processing circuitry, a first personal profile corresponding to the first adult vaper from a plurality of personal profiles based on the received identity verification information, the plurality of personal profiles corresponding to a plurality of adult vapers including the first adult vaper; and enabling, using the processing circuitry, operation of an electronic vaping device based on the received identity verification information and the first personal profile.

9. The method of claim 8, further comprising:

performing, using the processing circuitry, identity verification of the first adult vaper based on the received identity verification information and the first personal profile;

enabling the operation of the electronic vaping device in response to the identity verification being performed successfully; and disabling the operation of the electronic vaping device in response to the identity verification being performed unsuccessfully.

10. The method of claim 9, wherein the performing the identity verification of the first adult vaper further includes:

determining an age of the first adult vaper using the first personal profile; and determining whether the first adult vaper is legally permitted to operate the electronic vaping device based on the determined age of the first adult vaper.

11. The method of claim 8, wherein the identity verification information includes at least one of:

login information corresponding to the first adult vaper, a PIN code corresponding to the first adult vaper, biometric information corresponding to the first adult vaper, or any combinations thereof.

12. The method of claim 8, wherein each of the plurality of personal profiles includes at least one of:

a real name of the corresponding adult vaper, a personal address of the corresponding adult vaper, an email address of the corresponding adult vaper, a phone number of the corresponding adult vaper, age information of the corresponding adult vaper, gender information of the corresponding adult vaper, occupation information of the corresponding adult vaper, facial data of the corresponding adult vaper, fingerprint data of the corresponding adult vaper, retinal data of the corresponding adult vaper, facial data of the corresponding adult vaper, voice imprint of the corresponding adult vaper, or any combinations thereof.

13. The method of claim 12, wherein each of the personal profiles further includes at least one of:

augmented reality preference settings associated with the corresponding adult vaper, virtual reality preference settings associated with the corresponding adult vaper, electronic vaping preference settings associated with the corresponding adult vaper, electronic vaping devices that have been associated with the corresponding adult vaper, social media account information associated with the corresponding adult vaper, contact list information associated with the corresponding adult vaper, or any combinations thereof.

14. The method of claim 8, wherein the receiving the identity verification information further includes:

receive the identity verification information from at least one of a camera, a microphone, a finger print scanner, or any combinations thereof.

15. A non-transitory computer readable medium having computer readable instructions stored thereon, which when executed by processing circuitry, causes the processing circuitry to:
- receive identity verification information from a first adult vaper;
- determine a personal profile corresponding to the first adult vaper from a plurality of personal profiles based on the received identity verification information, the plurality of personal profiles corresponding to plurality of adult vapers including the first adult vaper; and
- enable operation of an electronic vaping device based on the received identity verification information and the first personal profile.

16. The non-transitory computer readable medium of claim 15, wherein the processing circuitry is further caused to:
- perform identity verification of the first adult vaper based on the received identity verification information and the first personal profile;
- enable the operation of the electronic vaping device in response to the identity verification being performed successfully; and
- disable the operation of the electronic vaping device in response to the identity verification being performed unsuccessfully.

17. The non-transitory computer readable medium of claim 15, wherein the processing circuitry is further caused to perform the identity verification of the first adult vaper by:
- determining an age of the first adult vaper using the first personal profile; and
- determining whether the first adult vaper is legally permitted to operate the electronic vaping device based on the determined age of the first adult vaper.

18. The non-transitory computer readable medium of claim 15, wherein the identity verification information includes at least one of:
- login information corresponding to the first adult vaper, a PIN code corresponding to the first adult vaper, biometric information corresponding to the first adult vaper, or any combinations thereof.

19. The non-transitory computer readable medium of claim 15, wherein each of the plurality of personal profiles includes at least one of:
- a real name of the corresponding adult vaper, a personal address of the corresponding adult vaper, an email address of the corresponding adult vaper, a phone number of the corresponding, adult vaper, age information of the corresponding adult vaper, gender information of the corresponding adult vaper, occupation information of the corresponding adult vaper, facial data of the corresponding adult vaper, fingerprint data of the corresponding adult vaper, retinal data of the corresponding adult vaper, facial data of the corresponding adult vaper, voice imprint of the corresponding adult vaper, or any combinations thereof.

20. The non-transitory computer readable medium of claim 19, wherein each of the plurality of personal profiles further includes at least one of:
- augmented reality preference settings associated with the corresponding adult vaper, virtual reality preference settings associated with the corresponding adult vaper, electronic vaping preference settings associated with the corresponding adult vaper, electronic vaping devices that have been associated with the corresponding adult vaper, social media account information associated with the corresponding adult vaper, contact list information associated with the corresponding adult vaper, or any combinations thereof.

* * * * *